US012676651B2

(12) United States Patent
Ye et al.

(10) Patent No.: US 12,676,651 B2
(45) Date of Patent: Jul. 7, 2026

(54) CODEBOOK SUBSET DESIGN FOR UPLINK DATA TRANSMISSION

(71) Applicant: Apple Inc., Cupertino, CA (US)

(72) Inventors: Sigen Ye, San Diego, CA (US); Haitong Sun, Cupertino, CA (US); Ankit Bhamri, Haar (DE); Wei Zeng, Saratoga, CA (US); Dawei Zhang, Saratoga, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 18/653,371

(22) Filed: May 2, 2024

(65) Prior Publication Data

US 2024/0380451 A1     Nov. 14, 2024

Related U.S. Application Data

(60) Provisional application No. 63/502,094, filed on May 13, 2023.

(51) Int. Cl.
H04B 7/0456 (2017.01)
H04B 7/0417 (2017.01)
H04B 7/06 (2006.01)

(52) U.S. Cl.
CPC ......... H04B 7/0478 (2013.01); H04B 7/0417 (2013.01); H04B 7/0639 (2013.01)

(58) Field of Classification Search
CPC ... H04B 7/0478; H04B 7/0417; H04B 7/0639
See application file for complete search history.

(56) References Cited

U.S. PATENT DOCUMENTS

| | | | | |
|---|---|---|---|---|
| 2019/0158161 A1* | 5/2019 | Faxér | .................. | H04B 7/0639 |
| 2020/0045644 A1* | 2/2020 | Sridharan | ............ | H04B 7/0639 |
| 2020/0343947 A1* | 10/2020 | Petersson | ............ | H04W 52/365 |
| 2021/0359805 A1* | 11/2021 | Petersson | .............. | H04W 72/04 |
| 2022/0167199 A1* | 5/2022 | Liu | ......................... | H04W 24/02 |
| 2022/0337295 A1* | 10/2022 | Liu | ..................... | H04B 7/0456 |
| 2024/0154655 A1* | 5/2024 | Rahman | .............. | H04B 7/0469 |
| 2024/0283503 A1* | 8/2024 | Lee | ..................... | H04B 7/0478 |
| 2024/0380451 A1* | 11/2024 | Ye | ......................... | H04B 7/0469 |

OTHER PUBLICATIONS

R1-2302307 ( FL Summary on SRI/TPMI Enhancements; Preparatory 3GPP TSG RAN WG112b-e. Apr. 17-26, 2023 (Year: 2023).*
Ri-2302307 (Year: 2023).*

* cited by examiner

*Primary Examiner* — Jaison Joseph
(74) *Attorney, Agent, or Firm* — Eschweiler & Potashnik, LLC; Matthew Glause

(57)          ABSTRACT
A user equipment (UE), a base station, a baseband processor or other network device can determine a codebook subset configuration of a plurality of multiple-input multiple-output (MIMO) layers for antenna ports of a codebook. The codebook subset configuration can include a nested structure based on a codebook configured for a fully-coherent UE, or a codebook configured for a partially-coherent UE. Fully-coherent precoders, a set of partially-coherent precoders or a set of non-coherent precoders can be configured in the codebook subset configuration to reduce a number of precoders from the partially-coherent precoders or the non-coherent precoders.

20 Claims, 28 Drawing Sheets

**Precoding information and number of layers, for 2 antenna ports, if transform precoder is disabled and *maxRank* = 2**

304

| Bit field mapped to index | codebookSubset = fullyAndPartialAndNonCoherent |
|---|---|
| 0 | 1 layer: TPMI=0 |
| 1 | 1 layer: TPMI=1 |
| 2 | 2 layers: TPMI=0 |
| 3 | 1 layer: TPMI=2 |
| 4 | 1 layer: TPMI=3 |
| 5 | 1 layer: TPMI=4 |
| 6 | 1 layer: TPMI=5 |
| 7 | 2 layers: TPMI=1 |
| 8 | 2 layers: TPMI=2 |
| 9-15 | reserved |

302

| Bit field mapped to index | codebookSubset = nonCoherent |
|---|---|
| 0 | 1 layer: TPMI=0 |
| 1 | 1 layer: TPMI=1 |
| 2 | 2 layers: TPMI=0 |
| 3 | reserved |

Precoding matrix W for two-layer transmission using two antenna ports with transform precoding disabled.

| TPMI index | W (ordered from left to right in increasing order of TPMI index) |
|---|---|
| 0 – 2 | $\dfrac{1}{\sqrt{2}}\begin{bmatrix}1 & 0\\ 0 & 1\end{bmatrix}$ $\quad$ $\dfrac{1}{2}\begin{bmatrix}1 & 1\\ 1 & -1\end{bmatrix}$ $\quad$ $\dfrac{1}{2}\begin{bmatrix}1 & 1\\ j & -j\end{bmatrix}$ |

Figure 4:
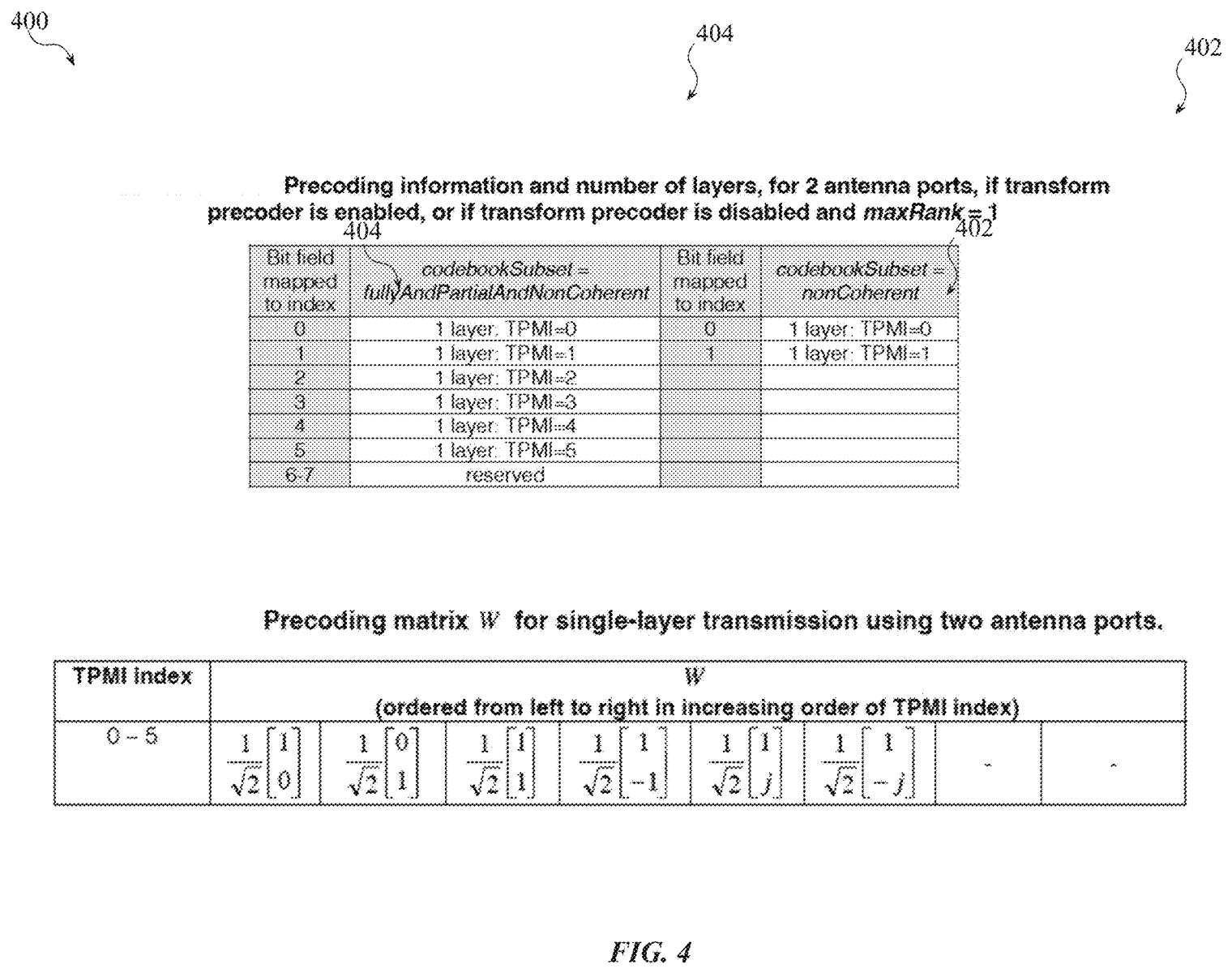

Precoding information and number of layers, for 2 antenna ports, if transform precoder is enabled, or if transform precoder is disabled and *maxRank*=1

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 1 layer: TPMI=2 | | |
| 3 | 1 layer: TPMI=3 | | |
| 4 | 1 layer: TPMI=4 | | |
| 5 | 1 layer: TPMI=5 | | |
| 6-7 | reserved | | |

Precoding matrix *W* for single-layer transmission using two antenna ports.

| TPMI index | W (ordered from left to right in increasing order of TPMI index) | | | | | |
|---|---|---|---|---|---|---|
| 0 - 5 | $\dfrac{1}{\sqrt{2}}\begin{bmatrix}1\\0\end{bmatrix}$ | $\dfrac{1}{\sqrt{2}}\begin{bmatrix}0\\1\end{bmatrix}$ | $\dfrac{1}{\sqrt{2}}\begin{bmatrix}1\\1\end{bmatrix}$ | $\dfrac{1}{\sqrt{2}}\begin{bmatrix}1\\-1\end{bmatrix}$ | $\dfrac{1}{\sqrt{2}}\begin{bmatrix}1\\j\end{bmatrix}$ | $\dfrac{1}{\sqrt{2}}\begin{bmatrix}1\\-j\end{bmatrix}$ |

Precoding matrix $W$ for three-layer transmission using four antenna ports with transform precoding disabled.

| TPMI index | $W$ (ordered from left to right in increasing order of TPMI index) | | | |
|---|---|---|---|---|
| 0 – 3 | $\frac{1}{2}\begin{bmatrix} 1 & 0 & 0 \\ 0 & 1 & 0 \\ 0 & 0 & 1 \\ 0 & 0 & 0 \end{bmatrix}$ (NC) | $\frac{1}{2}\begin{bmatrix} 1 & 0 & 0 \\ 0 & 1 & 0 \\ 1 & 0 & -1 \\ 0 & 0 & 0 \end{bmatrix}$ (PC) | $\frac{1}{2}\begin{bmatrix} 1 & 0 & 0 \\ 0 & 1 & 0 \\ -1 & 0 & 1 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 – 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | , |

Precoding matrix $W$ for two-layer transmission using two antenna ports with transform precoding disabled.

| TPMI index | $W$ (ordered from left to right in increasing order of TPMI index) | | |
|---|---|---|---|
| 0 ~ 2 | $\dfrac{1}{\sqrt{2}}\begin{bmatrix} 1 & 0 \\ 0 & 1 \end{bmatrix}$ | $\dfrac{1}{2}\begin{bmatrix} 1 & 1 \\ 1 & -1 \end{bmatrix}$ | $\dfrac{1}{2}\begin{bmatrix} 1 & 1 \\ j & -j \end{bmatrix}$ |

For partially coherent uplink precoding by an 8TX UE codebook, Ng=2,

* Following rank and layer splitting cases are supported

| Rank | All layers in one Antenna Group | Layers split across 2 Antenna Groups |
|---|---|---|
| 1 | (1,0), (0,1) | - |
| 8 | - | (4,4) |

For partially coherent uplink precoding by an 8TX UE, Ng=2,

* At least the following combinations of layer splitting are supported
  ○ FFS: For rank>4, all the layers for each CW is mapped to only one antenna group

| Rank | All layers in one Antenna Group | Layers split across 2 Antenna Groups |
|---|---|---|
| 2 | (2,0), (0,2) | - |
| 2 | - | (1,1) |
| 3 | (3,0), (0,3) | - |
| 3 | - | (1,2), (2,1) |
| 4 | (4,0), (0,4) | - |
| 4 | - | (2,2) |
| 5 | - | (2,3), (3,2) |
| 6 | - | (3,3) |
| 7 | - | (3,4), (4,3) |

For partially coherent uplink precoding by an 8TX UE codebook, Ng=4, Alt1 is supported where
* Precoding design is based on Rel-15 UL 2TX codebook,
  o Full-coherent precoders are used For partially coherent uplink precoding by an 8TX UE codebook, Ng=4,
* The following rank and layer splitting cases are supported.

| Rank | All layers in one Antenna Group | Layers split across 4 Antenna Groups |
|---|---|---|
| 1 | (1,0,0,0), (0,1,0,0), (0,0,1,0), (0,0,0,1) | - |
| 2 | (2,0,0,0), (0,2,0,0), (0,0,2,0), (0,0,0,2) | - |
| 2 | - | Transmission by 2 of the 4 antenna groups: (1,1,0,0), (1,0,1,0), (1,0,0,1), (0,1,1,0), (0,1,0,1), (0,0,1,1) |
| 4 | - | (1,1,1,1) |
| 4 | - | Transmission by 2 of the 4 antenna groups: (2,2,0,0), (2,0,2,0), (2,0,0,2), (0,2,2,0), (0,2,0,2), (0,0,2,2) |
| 8 | - | (2,2,2,2) |

FIG. 13

Figure 14:
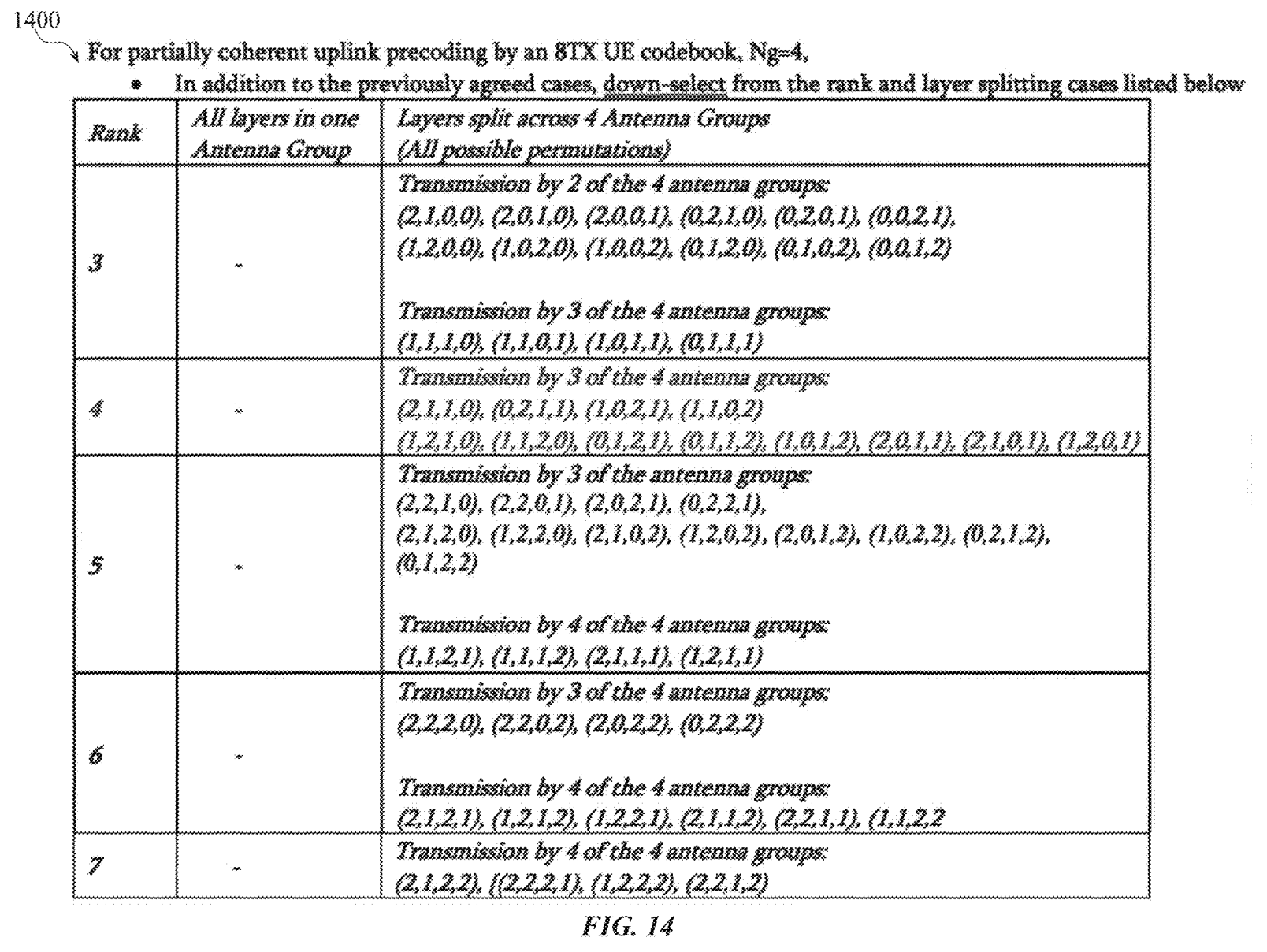

For partially coherent uplink precoding by an 8TX UE codebook, Ng=4,

* In addition to the previously agreed cases, down-select from the rank and layer splitting cases listed below

| Rank | All layers in one Antenna Group | Layers split across 4 Antenna Groups (All possible permutations) |
|---|---|---|
| 3 | · | Transmission by 2 of the 4 antenna groups: (2,1,0,0), (2,0,1,0), (2,0,0,1), (0,2,1,0), (0,2,0,1), (0,0,2,1), (1,2,0,0), (1,0,2,0), (0,1,2,0), (0,1,0,2), (0,0,1,2) Transmission by 3 of the 4 antenna groups: (1,1,1,0), (1,1,0,1), (1,0,1,1), (0,1,1,1) |
| 4 | · | Transmission by 3 of the 4 antenna groups: (2,1,1,0), (0,2,1,1), (1,0,2,1), (1,1,0,2) (1,2,1,0), (1,1,2,0), (0,1,1,2), (1,0,1,2), (2,0,1,1), (2,1,0,1), (1,2,0,1) Transmission by 3 of the antenna groups: (2,2,1,0), (2,2,0,1), (2,0,2,1), (0,2,2,1), (2,1,2,0), (2,1,0,2), (1,2,0,2), (2,0,1,2), (1,0,2,2), (0,2,1,2), (0,1,2,2) |
| 5 | · | |
| 6 | · | Transmission by 4 of the 4 antenna groups: (1,1,2,1), (1,1,1,2), (2,1,1,1), (1,2,1,1) Transmission by 3 of the 4 antenna groups: (2,2,2,0), (2,2,0,2), (2,0,2,2), (0,2,2,2) |
| 7 | · | Transmission by 4 of the 4 antenna groups: (2,1,2,1), (1,2,1,2), (1,2,2,1), (2,1,1,2), (1,1,2,2) Transmission by 4 of the 4 antenna groups: (2,1,2,2), (2,2,2,1), (1,2,2,2), (2,2,1,2) |

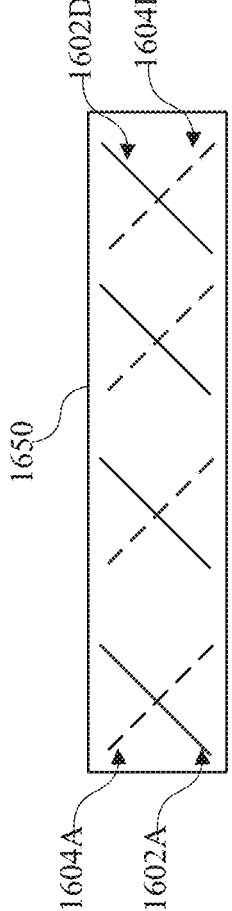
FIG. 16

For partially coherent uplink precoding by an 8TX UE codebook, Ng=2,
* Following rank and layer splitting cases are supported

| Rank | All layers in one Antenna Group | Layers split across 2 Antenna Groups |
|------|---------------------------------|--------------------------------------|
| 1 | (1,0), (0,1) | - |
| 8 | - | (4,4) |

For partially coherent uplink precoding by an 8TX UE, Ng=2,
* At least the following combinations of layer splitting are supported
  ○ FFS: For rank>4, all the layers for each CW is mapped to only one antenna group

| Rank | All layers in one Antenna Group | Layers split across 2 Antenna Groups |
|------|---------------------------------|--------------------------------------|
| 2 | (2,0), (0,2) | - |
| 2 | - | (1,1) |
| 3 | (3,0), (0,3) | - |
| 3 | - | (1,2), (2,1) |
| 4 | (4,0), (0,4) | - |
| 4 | - | (2,2) |
| 5 | - | (2,3), (3,2) |
| 6 | - | (3,3) |
| 7 | - | (3,4), (4,3) |

*FIG. 17*

| Rank | All layers in one Antenna Group | Layers split across 4 Antenna Groups |
|---|---|---|
| 1 | (1,0,0), (0,1,0,0), (0,0,1,0), (0,0,0,1) | . |
| 2 | (2,0,0,0), (0,2,0,0), (0,0,2,0), (0,0,0,2) | . |
| 2 | . | Transmission by 2 of the 4 antenna groups:<br>(1,1,0,0), (1,0,1,0), (1,0,0,1), (0,1,1,0), (0,1,0,1), (0,0,1,1) |
| 4 | . | (1,1,1,1) |
| 4 | . | Transmission by 2 of the 4 antenna groups:<br>(2,2,0,0), (2,0,2,0), (2,0,0,2), (0,2,2,0), (0,2,0,2), (0,0,2,2) |
| 8 | . | (2,2,2,2) |

For partially coherent uplink precoding by an 8TX UE codebook, Ng=4.
* In addition to the previously agreed cases, down-select from the rank and layer splitting cases listed below

| Rank | All layers in one Antenna Group | Layers split across 4 Antenna Groups (All possible permutations) |
|------|-------------------------------|------------------------------------------------------------------|
| 3 | * | Transmission by 2 of the 4 antenna groups: (2,0,0), (2,0,1,0), (2,0,0,1), (0,2,1,0), (0,2,0,1), (0,0,2,1), (1,2,0,0), (1,0,2,0), (1,0,0,2), (0,1,2,0), (0,1,0,2), (0,0,1,2) |
| 4 | * | Transmission by 3 of the 4 antenna groups: (1,1,1,0), (1,1,0,1), (1,0,1,1), (0,1,1,1); Transmission by 2 of the 4 antenna groups: (2,2,0,0), (0,2,1,1), (1,0,2,1), (1,1,0,2) |
| 5 | * | Transmission by 3 of the antenna groups: (2,2,1,0), (2,2,0,1), (0,2,2,1), (2,1,2,0), (1,2,2,0), (1,2,0,2), (2,0,1,2), (1,0,2,2), (0,2,1,2), (0,1,2,2) |
| 6 | * | Transmission by 4 of the 4 antenna groups: (1,1,2,1), (1,1,1,2), (2,1,1,1), (1,2,1,1); Transmission by 3 of the 4 antenna groups: (2,2,2,0), (2,0,2,2), (0,2,2,2) |
| 7 | * | Transmission by 4 of the 4 antenna groups: (2,1,2,1), (1,2,1,2), (2,2,1,1), (2,1,1,2), (1,1,2,2), (2,1,1,2), (1,1,2,2), (2,1,2,2), (2,2,1,2) |

For partially coherent uplink precoding by an 8TX UE codebook, Ng=4,
- The following rank and layer splitting cases are supported.

| Rank | All layers in one Antenna Group | Layers split across 4 Antenna Groups |
|---|---|---|
| 1 | (1,0,0,0), (0,1,0,0), (0,0,1,0), (0,0,0,1) | - |
| 2 | (2,0,0,0), (0,2,0,0), (0,0,2,0), (0,0,2) | - |
| 2 | - | Transmission by 2 of the 4 antenna groups: (1,1,0,0), (1,0,1,0), (1,0,0,1), (0,1,1,0), (0,1,0,1), (0,0,1,1) |
| 4 | - | (1,1,1,1) |
| 4 | - | Transmission by 2 of the 4 antenna groups: (2,2,0,0), (2,0,2,0), (2,0,0,2), (0,2,2,0), (0,2,0,2), (0,0,2,2) |
| 8 | - | (2,2,2,2) |

For partially coherent uplink precoding by an 8TX UE codebook, Ng=4,
• In addition to the previously agreed cases, down-select from the rank and layer splitting cases listed below

| Rank | All layers in one Antenna Group | Layers split across 4 Antenna Groups (All possible permutations) |
|---|---|---|
| 3 | - | Transmission by 2 of the 4 antenna groups: (2,1,0,0), (2,0,1,0), (2,0,0,1), (0,2,1,0), (0,2,0,1), (0,0,2,1), (1,2,0,0), (1,0,2,0), (1,0,0,2), (0,1,2,0), (0,1,0,2), (0,0,1,2) Transmission by 3 of the 4 antenna groups: (1,1,1,0), (1,1,0,1), (1,0,1,1), (0,1,1,1) |
| 4 | - | Transmission by 2 of the 4 antenna groups: (2,1,1,0), (1,0,2,1), (1,1,0,2) Transmission by 3 of the 4 antenna groups: (2,1,1,0), (2,1,0,1), (2,0,1,1), (1,1,2,0), (1,1,0,2), (0,1,1,2), (2,0,1,1), (2,1,0,1), (1,2,0,1), (1,2,1,0), (0,1,2,1) |
| 5 | - | Transmission by 3 of the antenna groups: (2,2,1,0), (2,2,0,1), (2,0,2,1), (2,1,2,0), (2,1,0,2), (1,2,0,2), (2,0,1,2), (0,2,1,2), (0,1,2,2) |
| 6 | - | Transmission by 4 of the 4 antenna groups: (1,1,2,1), (1,1,1,2), (2,1,1,1), (1,2,1,1) Transmission by 3 of the 4 antenna groups: (2,2,2,0), (2,0,2,2), (0,2,2,2) |
| 7 | - | Transmission by 4 of the 4 antenna groups: (2,1,2,1), (1,2,1,2), (1,2,2,1), (2,1,1,2), (1,1,2,2) Transmission by 4 of the 4 antenna groups: (2,1,2,2), (2,2,2,1), (1,2,2,2), (2,2,1,2) |

FIG. 22

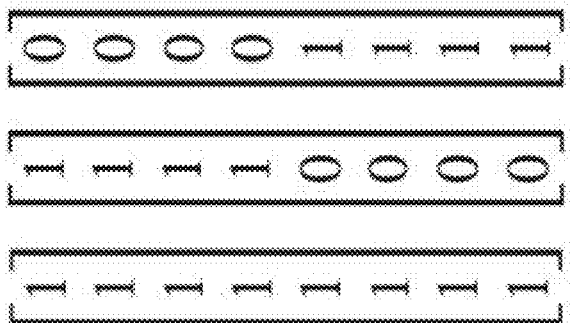
*FIG. 23*

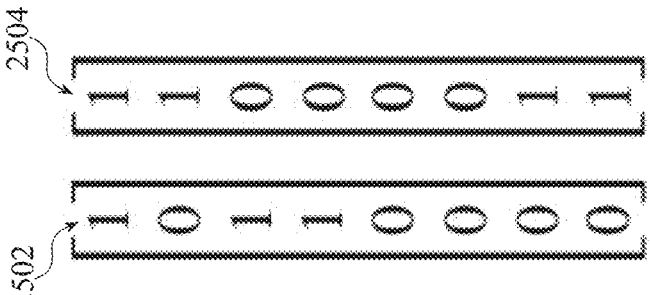
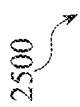
FIG. 25

2700

APPLICATION SERVER(S)

2740   2738

2750

2734

EXTERNAL NETWORK(S)

2736

NETWORK (NW) ELEMENT(S) / COMPONENT(S)

2732

2730

2726

2728

2724

122

RAN 122-1

2723

122-2

2714-1

2712

2714-2

110

UE 110-1

UE 110-2

2718

AP

2716

2800

To antenna(s) and/or wired
connection(s)

CODEBOOK SUBSET DESIGN FOR UPLINK DATA TRANSMISSION

REFERENCE TO RELATED APPLICATIONS

This application claims the benefit of U.S. Provisional Application No. 63/502,094, filed on May 13, 2023, the contents of which are hereby incorporated by reference in their entirety

FIELD

The present disclosure is related to wireless technology and codebook subset design for uplink (UL) data transmission.

BACKGROUND

Wireless communication networks and wireless communication services are becoming increasingly dynamic, complex, and ubiquitous. For example, some wireless communication networks may be developed to implement fifth generation (5G) or new radio (NR) technology, sixth generation (6G) technology, and so on. Such technology may include solutions for enabling user equipment (UE) and network devices, such as base stations, to communicate with one another. Multiple-input and multiple-output (MIMO), which equips the base station (BS) with many antennas, can considerably improve system performance. One benefit of MIMO is based on the knowledge of channel state information (CSI) feedback. The base stations can determine values for precoders based on CSI signals fed back from the UEs. In particular, the UE performs measurements on signals received from the base stations and feeds back information regarding the measurements to be utilized for determining values for the precoders. However, the feedback overhead can be substantial due to the high dimension of CSI in MIMO systems. For uplink (UL) MIMO, the UE may transmit sounding reference signals (SRS) to the base stations so that the base stations may perform measurements and choose the best precoders for UL transmission. The base station may indicate to a UE the precoder to be used for UL transmission in uplink grant.

BRIEF DESCRIPTION OF THE DRAWINGS

FIG. 3 illustrates an example precoding information with a codebook subset configurations in accordance with various aspects.

FIG. 4 illustrates another example precoding information with a codebook subset configurations in accordance with various aspects.

FIG. 5 illustrates another example precoding information with a codebook subset configurations in accordance with various aspects.

FIG. 6 illustrates an example precoding matrix or codebook with a codebook subset configurations in a nested precoding structure in accordance with various aspects.

FIG. 9 illustrates another example precoding matrix or codebook with a codebook subset configurations in a nested precoding structure in accordance with various aspects.

FIG. 10 illustrates another example precoding matrix or codebook with a codebook subset configurations in a nested precoding structure in accordance with various aspects.

FIG. 11 illustrates another example precoding matrix or codebook with a codebook subset configurations in a nested precoding structure in accordance with various aspects.

FIG. 12 illustrates an example of precoding antenna grouping information with up to 8 layers and antenna grouping in accordance with various aspects.

FIG. 13 illustrates another example of precoding antenna grouping information with up to 8 layers and antenna grouping in accordance with various aspects.

FIG. 14 illustrates another example of precoding antenna grouping information with up to 8 layers and antenna grouping in accordance with various aspects.

FIG. 15-16 illustrate other antenna structures for codebook signaling between a base station and a UE in accordance with various aspects.

FIG. 17 illustrates an example of precoding antenna grouping information with up to 8 layers and antenna grouping in accordance with various aspects.

FIG. 18 illustrates an example of precoding antenna grouping information with up to 8 layers and antenna grouping in accordance with various aspects.

FIG. 19 illustrates an example of precoding antenna grouping information with up to 8 layers and antenna grouping in accordance with various aspects.

FIG. 21 illustrates an example of precoding antenna grouping information with up to 8 layers and antenna grouping in accordance with various aspects.

FIG. 22 illustrates an example of precoding antenna grouping information with up to 8 layers and antenna grouping in accordance with various aspects.

FIG. 23 illustrates an example of precoders in accordance with various aspects.

FIG. 25 illustrates an example of precoders in accordance with various aspects.

DETAILED DESCRIPTION

Figure 1:
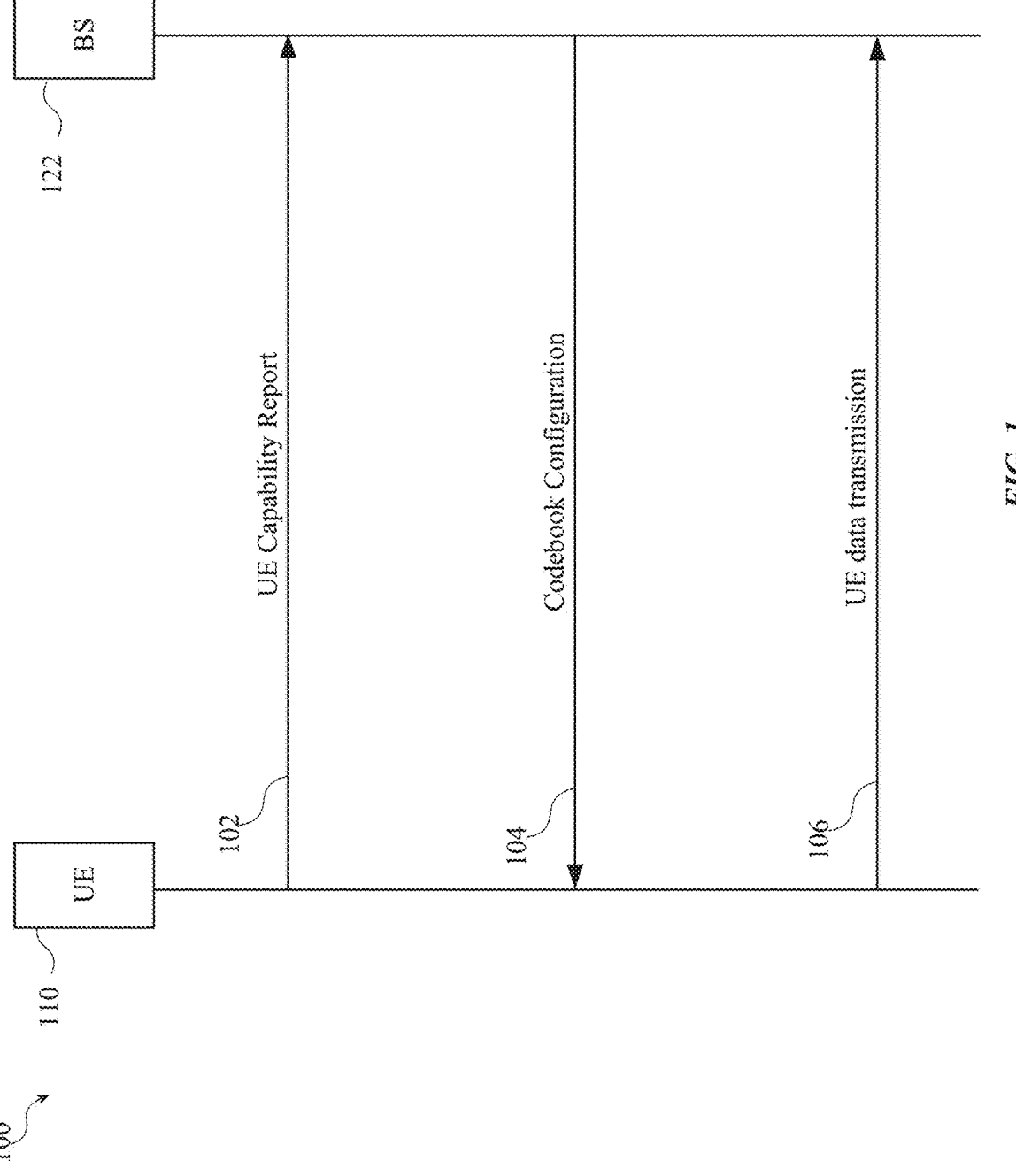
FIG. 1 illustrates an example of a signaling diagram for configuration of a codebook or codebook subset configuration based on a user equipment (UE) capability report in accordance with various aspects.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Various aspects include methods and codebook subset configurations of multiple-input multiple-output (MIMO) operations that exploit multiple antennas at both the UE and the base station to improve the efficiency by reducing overhead and complexity. Such a reduction in overhead and complexity can be particularly beneficial where new radio standards (NR) support MIMO antennas with up to 8 transmit (Tx) layer spatial multiplexing using up to 8 antenna ports with precoding enhancements. Eight transmit layer uplink (UL) operations support up to 8 layers per user equipment (UE) in UL to target premise equipment (CPE)/fixed wireless access (FWA)/vehicle/industrial devices, for example. Support for up to 8 Tx UL operations may require enhancements to the codebook design and the corresponding precoder indication, especially when nested codebook structures are configured within a codebook. A nested codebook structure means that for a fully-coherent UE, the codebook also includes partially-coherent and/or non-coherent precoders, in addition to fully-coherent precoders; for a partially-coherent UE, the codebook also include non-coherent precoders, in addition to partially-coherent precoders. A minimal complex multiplications design rule may be configured, for example, in codebook multiplications for antenna codebooks using +1, −1, +j, and −j.

In an aspect, the UE or base station can process or generate a codebook subset configuration of up to 8 MIMO layers based on a fully-coherent codebook (a codebook configured for a fully-coherent UE, or a partially-coherent codebook (a codebook configured for a partially-coherent UE), comprising a nested precoder structure. The codebook subset configuration operates to reduce a number of precoders from the fully-coherent codebook or the partially-coherent codebook. A transmission of data can then be transmitted based on the codebook subset configuration to reduce the complexity. The fully-coherent codebook includes the fully-coherent precoders and a subset of one or more of: the partially-coherent precoders, or non-coherent precoders, that use a subset of antenna ports compared to antenna ports of the fully-coherent precoders. The partially-coherent codebook with a number of antenna groups include the partially-coherent precoders for a first number of coherent antenna groups and a subset of one or more of: the partially-coherent precoders for a second number of coherent antenna groups, or non-coherent precoders, that use a subset of antenna ports compared to antenna ports of the partially-coherent precoders for the first number of coherent antenna groups.

Additional aspects and details of the disclosure are further described below with reference to figures.

FIG. 1 illustrates an example signal flow 100 between a UE 110 and a network device or base station 122 (e.g., a gNB, or other network component) for configuring a codebook subset configuration in order to enable efficient wireless communications between antennas for uplink (UL) data transmission. The UE 110 can include a smartphone (e.g., handheld touchscreen mobile computing devices connectable to one or more wireless communication networks). Additionally, or alternatively, UE 110 can include other types of mobile or non-mobile computing devices configured for wireless communications, such as personal data assistants (PDAs), pagers, laptop computers, desktop computers, wireless handsets, etc. UE 110 can include one or more UEs 110 such as internet of things (IoT) devices (or IoT UEs). Additionally, or alternatively, an IoT UE can utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, or the like. Additionally, the UE 110 can include vehicle UEs, pedestrian UEs, or vehicle to everything (V2X) UEs.

Along with MIMO, beamforming is a technique used to improve signal transmission between the base station 122 and the UE 110. Instead of broadcasting a signal to a wide area, the base station 122 aims the signal toward the UE 110. One way to achieve this is by separating the signal to be transmitted into an array of separate antenna signals and then weighting the magnitude and phase of each signal. An improvement of the received signal under this technique is known as a beamforming gain.

Codebook designs can be for multiple-input-multiple output (MIMO) wireless cellular systems, for example. The codebooks for data transmissions in uplink from the UE to the base station support beam selection, co-phasing between polarizations, and beam combining. Although the antennas remain in fixed positions, a technique known as adaptive beamforming may be used to control the beams transmitted from the antennas of the UE. In adaptive beamforming, the signal or set of signals corresponding to multiple MIMO layers for transmission from the antenna array is pre-coded, or multiplied, by specific antenna weights. The precoding or beamforming weights may be arranged into a matrix where each row corresponds to the antenna ports and each column to the MIMO layer. Depending on the selection of the weight, it is possible to skew or to change the beamforming from the antenna of the UE without changing the physical antenna position.

For uplink (UL) MIMO, the UE can transmit sounding reference signals (SRS) to the base station. The base station can then perform measurements and choose precoders for UL transmission based on the SRS or the UE capability information 102. The base station can then indicate to the UE the precoders to be used for UL transmission 106 in uplink grant in a codebook of precoding matrix (ices). In particular, the base station can use the SRS transmissions to select antenna ports to be used for the physical uplink shared channel (PUSCH), and to select the appropriate Rank and precoding weights by a codebook. In turn, the base station provides feedback to the UE in terms of an SRS resource indicator (SRI), rank indicator (RI) and transmit precoding matrix indicator (TPMI). The UE capability information 102 can include various upper limits for a maximum number of supported SRS resources, for example. Various aspects configure codebooks for uplink data transmission with a reduced number of precoders for 8 Tx PUSCH transmissions in order to reduce complexity and increase efficiency. For example, a UE supporting fully-coherent precoders can include a subset of partially-coherent and/or non-coherent precoders that use a subset of antenna ports compared to the fully-coherent precoders. Additionally, or alternatively, a UE supporting partially-coherent precoders can include a subset of partially-coherent and/or non-coherent precoders that use a subset of antenna ports within at least one antenna group.

Figure 2:
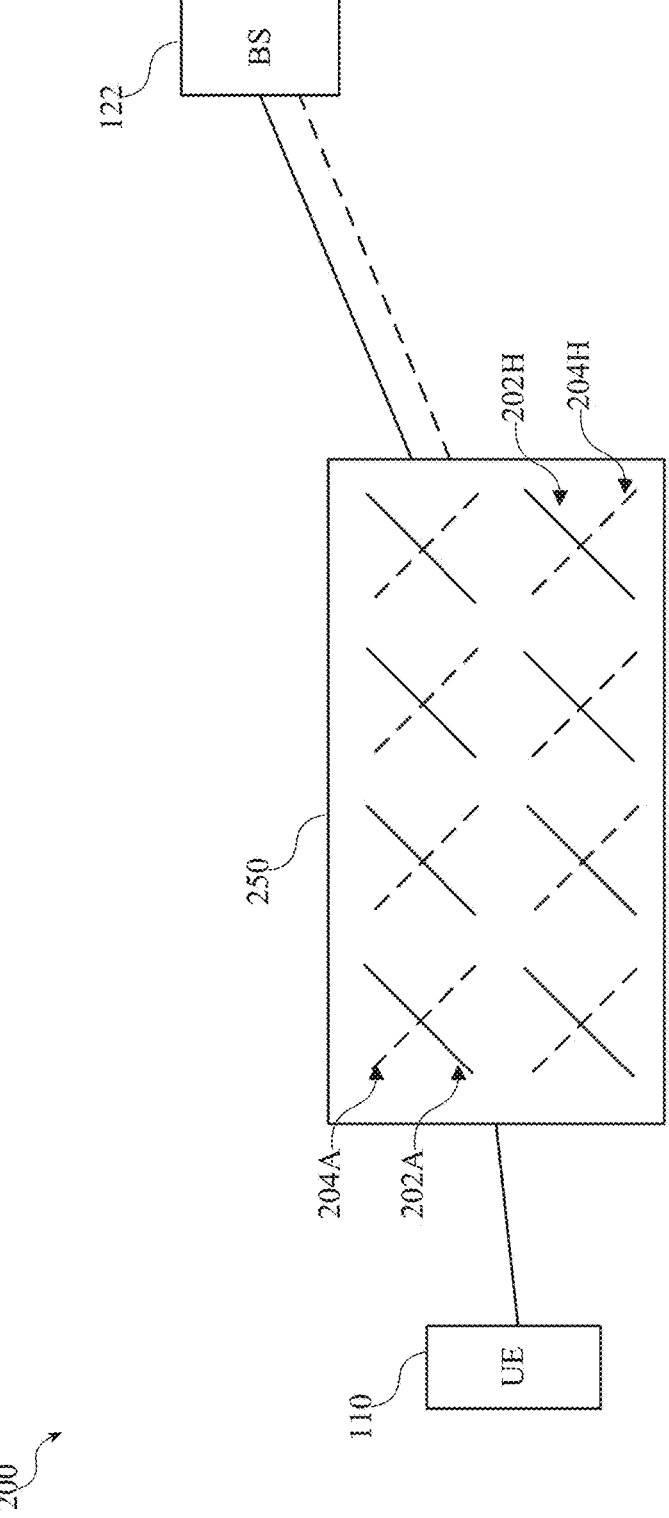
FIG. 2 illustrates an antenna structure for codebook signaling between a base station and a UE in accordance with various aspects.

FIG. 2 is a simplified illustration of a wireless cellular environment, used to illustrate beamforming, according to some aspects. The wireless cellular environment includes the base station 122 and one or more UEs 110, which can occupy various locations within a cell of the base station. The UE 110 includes an antenna array 250 with a number of antennas (e.g., 16), wherein 202A through 202H are a first set of antennas with one polarization and 204A through 204H are a second set of antennas of another polarization. The antenna array 250 comprising antennas 202A through 202H and 204A through 204H can transmit beams of one polarization (dotted lines) and beams of another polarization (solid lines), to UEs 110-1 and 110-2. By employing beam forming, the UE can transmit data with the beams directionally. A signal to be transmitted by a UE having multiple antennas may be multiplied by different complex weights, using a precoding vector, such that the signals transmitted by each antenna can target a specific location. The location may be a portion of the cellular region or base station, with a goal being improved signal transmission.

In FIG. 2, antenna ports are not necessarily transmitted from the physical antennas of the UE 110. Rather, the multiple antennas 202A through 202H and 204A through 204H making up the antenna array of the UE can be used to create one or more beams. Each antenna port (not necessarily a physical antenna) is transmitted in accordance to the beams of the UE. In some aspects, for each beam, a pair of antenna ports are used, where each antenna port corresponds to the same beam, but with different polarizations, respectively.

Each antenna port can be transmitted on a pair of resource element (REs) within a physical resource block (PRB) pair, wherein a PRB in the case of a subframe with a normal cyclic prefix consists of a number of subcarriers (e.g., 12 or other number) in the vertical (frequency) direction and a number of symbols (e.g., 7 or other number) in the horizontal (time) direction. The pair of antenna ports transmitted on the same REs may correspond to the same beam or different beams. In this example, the pair of RE can be used to transmit two antenna ports with the same beamforming and orthogonal polarizations, however the beam and polarization assignment to antenna ports are not limited to this example.

The antenna array 250 structure can include one or more antennas that transmit signals at different antenna polarizations. For example, the illustrated antenna array 250 can transmit signals with a first polarization (which may be referred to as "polarization 0") and a second polarization (which may be referred to as "polarization 1"). In particular, the antenna array 250 shows a first antenna 202 with a first polarization (indicated by the solid line) and a second antenna 204 with a second polarization (indicated by the dotted line). The antenna array 250 may include a one or more antennas with first polarization (indicated by the solid lines) and one or more antennas with second polarization (indicated by the dotted lines). In some aspects, the second polarization can be orthogonal to the first polarization, in which case the pair of antenna ports can be considered a cross-polarized (cross-pol) antenna. Cross-pol type antenna structures possess coherency between one another. Cross-pol antennas are considered at a same location, and thus, considered either blocked/in-use/not active or not blocked/not in-use/active at together as a pair of antennas. While the first polarization and the second polarization are described as being generated by separate antennas, it should be understood that a single antenna may implement one or more polarizations (e.g., two polarizations) in other aspects or polarizations may be implemented by a pair of different antennas such as cross-pol antennas at a same location.

One or more signals can be transmitted by the antennas of the antenna array 250. Signals transmitted by antennas with the first polarization can be transmitted in the first polarization and signals transmitted by the antennas with the second polarization can be transmitted in the second polarization. One or more precoders can determine the phases and amplitudes for signals transmitted by the antennas. The precoders can be utilized for determining an amplitude of the signals transmitted by the antennas or determining which antennas are to transmit the signals. In some aspects, the precoders can further be utilized to determine directions in which the signals are to be transmitted, such as in beamforming implementations.

In the MIMO framework, multiple beams (also known as spatial layers, MIMO layers, or transmission layers herein) can be transmitted over the same time and frequency resources to maximize spectral efficiency. A transmission (Tx) layer or MIMO spatial layer herein can refer to as codebook layers of MIMO spatial and/or frequency precoders for transmission, or MIMO layers. An RI indicates the number of MIMO layers that can be simultaneously transmitted to the UE. Because of their orthogonality, the two signals do not necessarily create interference with one another even though the same time and frequency resources are used.

It is possible to support all three NR coherence capabilities in one MIMO codebook. A precoding matrix or vector, or precoder, without any zero magnitude elements requires a fully coherent transmission chain to maintain the relative phase set by the non-zero magnitude elements, and so such a precoder can only be used by a UE 200 with a fully coherent capability, and is not supported by UEs with partial coherence or non-coherent capabilities.

A precoding matrix or vector, or precoder, with only one non-zero magnitude element for every layer (e.g., where a precoding matrix or codebook with multiple columns has only one non-zero magnitude in every column) does not require phase coherence, since no antenna ports within a spatial layer are combined together. Therefore, such a precoder can be used by a UE 110 that supports non-coherent transmission or non-coherent precoder. Then if the antennas are non-coherent all that are used are non-coherent precoders.

A precoder with multiple non-zero magnitude elements and at least one zero magnitude element for a given spatial layer (e.g., where a precoding matrix or codebook with multiple columns has only one zero magnitude per column) has to have phase coherence among the antenna ports corresponding to the non-zero ports only when transmitting that spatial layer. Such UEs therefore support partial coherence, but not full-coherence capability for at least the given spatial layer. If the precoders of the UE can maintain coherency within an antenna group, then it is coherent within the group, but non-coherent across the antenna groups, then the precoders are referred to as partially-coherent precoders.

If a UE can maintain the coherency between different antenna ports, then it can support being a fully-coherent precoder. A fully-coherent UE is capable of supporting partial coherent and non-coherent transmissions. Precoders with all, a part or only one non-zero magnitude element per spatial layer can all be in a codebook used for fully-coherent UE. A codebook can be configured with precoders in a nested structure, such that partially/non-coherent precoders can be included in a fully-coherent codebook, and non-coherent precoders can be included in a partially-coherent codebook. For example, fully-coherent UEs can be configured with a "fullyAndPartialAndNoncoherent", "partialAndCoherent" or "nonCoherent" codebook subset. Partial-coherent UEs can be configured with "partialAndCoherent" or "nonCoherent" codebook subset.

While all three coherence capabilities can be in one codebook, UEs with either partial or non-coherent capability (e.g., a partially-coherent UE) do not support the entire codebook. However, partial coherence capable UEs (partially-coherent UEs) can use precoders from the codebook that match the antenna ports on which it can transmit coherently, as well as those that do not require coherence. Similarly, a UE 110 supporting only non-coherent capability can use precoders from the codebook that do not require coherent transmission. Therefore, a UE 110 supporting or indicating full coherence (fully-coherent UE) is assumed to support TPMIs identifying precoders where all elements have non-zero magnitude, precoders where at least one element has zero magnitude, and precoders where only one element per spatial layer has non-zero magnitude. A UE 110 indicating partial coherence is assumed to support transmit precoder matrix indicators/indices (TPMIs) identifying precoders where at least one element has zero magnitude, and precoders where only one element per spatial layer has non-zero magnitude. A UE 110 indicating non-coherent capability is assumed to support TPMIs identifying precoders where only one element per spatial layer has non-zero magnitude.

A partially coherent UE 110 can only maintain well controlled relative phase between particular transmit chains and antenna ports. Therefore, not only the number of non-zero magnitude elements a precoder has must match the partial coherence capability, but the elements which have non-zero magnitude on a spatial layer must correspond to antenna ports for which phase is well maintained. Non-zero elements in the precoding matrices represent weights to be applied to respective antenna ports while zero magnitude elements represent non-transmitting antenna ports. In an aspect, in order to identify its partial coherence capability, a UE 200 can indicate which pairs of antenna ports can support coherent operation, such as by providing a level of support for coherence in the UE capability information.

FIG. 3 illustrates an example of precoding table 300 with precoding information, along with a number of layers for two antenna ports (APs) with a maximum number of layers, or maximum rank, of 2. The table 300 is constructed with a codebook subset configuration 302 for non-coherent precoders. When comparing the non-coherent precoders of the non-coherent codebook subset configuration 302 with the precoders of the codebook subset configuration 304 configured as a fully-coherent, partially-coherent and non-coherent ("fullyAndPartialAndNonCoherent") codebook, which corresponds to the fully-coherent case, the same entries are included; in addition with some more entries potentially being added into the codebook potentially with the "reserved" entry. Below the table 300 is an example of precoders W corresponding to a TPMI index for a two-layer transmission using two antenna ports, for example.

FIG. 4 illustrates another example of a precoding table 400 with precoding information, along with a number of layers for two antenna ports with a maximum rank of 1. A similar scenario as FIG. 3 can be observed where the codebook subset configuration 402 has entries that overlap with the entries of the codebook subset configuration 404. Below the table 400 is an example of precoders W corresponding to a TPMI index for a single-layer transmission using two antenna ports, for example.

Figure 5:
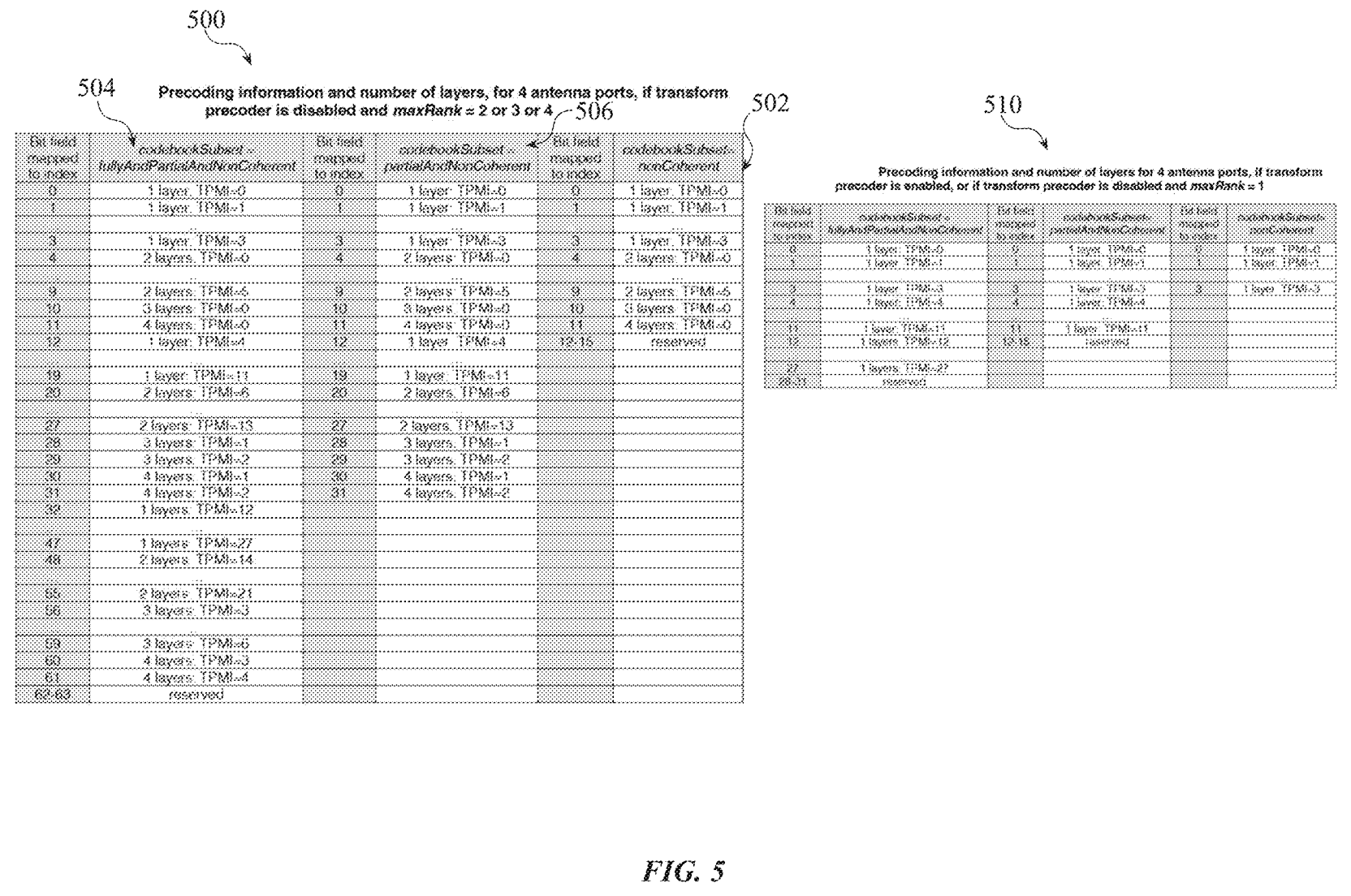

FIG. 5 illustrates another example of a precoding table 500 with precoding information, along with a number of layers for four antenna ports with a maximum rank of 4 as a 4 Tx layer case. Here, the non-coherent precoders of a non-coherent codebook subset configuration 502 are nested into the partially-coherent precoders of the partially-coherent codebook subset configuration 506, in which the first 12 precoders are the same as one another, along with some additional entries covering the partially-coherent case (e.g., at indices 12-31) in the partially-coherent codebook subset configuration 506. In addition, fully-coherent precoder entries can be seen at the full-coherent codebook subset configuration 504 where some additional precoders cover the fully-coherent functionality. The same scenario can be observed at the table 510 on the right with similar conditions but for a max Rank=1 or a Rank=1 for four antenna ports.

Figure 6:
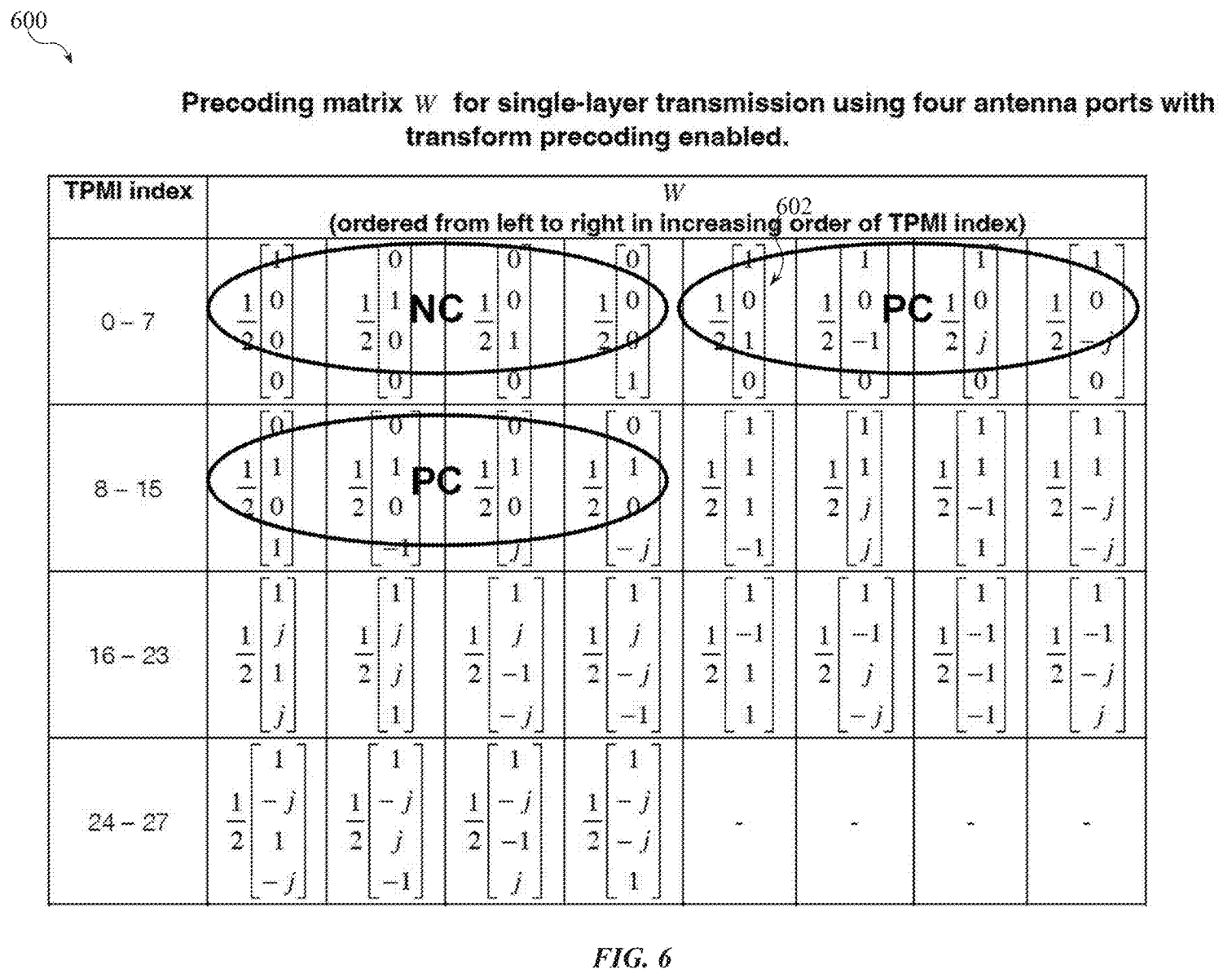
Figure 7:
FIG. 7 illustrates another example precoding matrix or codebook with a codebook subset configurations in a nested precoding structure in accordance with various aspects.

FIGS. 6-7 illustrate examples of precoders of a precoding matrix W for a single layer transmission using four antenna ports of a rank=1 for a discrete Fourier transform-spread orthogonal frequency divisional multiplexing (DFT-S-OFDM) and a cyclic-prefix orthogonal frequency divisional multiplexing (CP-OFDM), respectively. As illustrated on the left hand side of each figure, the tables (codebooks/precoding matrices) 600 and 700 have an index from zero to 27 to represent the different precoders of the precoding matrix or codebook of precoding matrices. The figures demonstrate a nested property for fully-coherent codebook configurations, including where first subset of precoders (e.g., first four precoders) corresponding to non-coherent precoders and the next set of precoders (e.g., next 8 precoders) sequentially by index correspond to partially-coherent precoders; the remaining precoders of the codebook (not circled) correspond to fully-coherent precoders. In the fully-coherent precoders all the antenna ports are being used, but for the partially-coherent precoders only some of the antenna ports are being used and taking advantage of the coherency between, for example, antenna 1 and antenna 3 here (e.g., at the "1"s in the first precoders 602 and 702 of the partially-coherent precoders).

Figure 8:
FIG. 8 illustrates another example precoding matrix or codebook with a codebook subset configurations in a nested precoding structure in accordance with various aspects.
Figure 10:
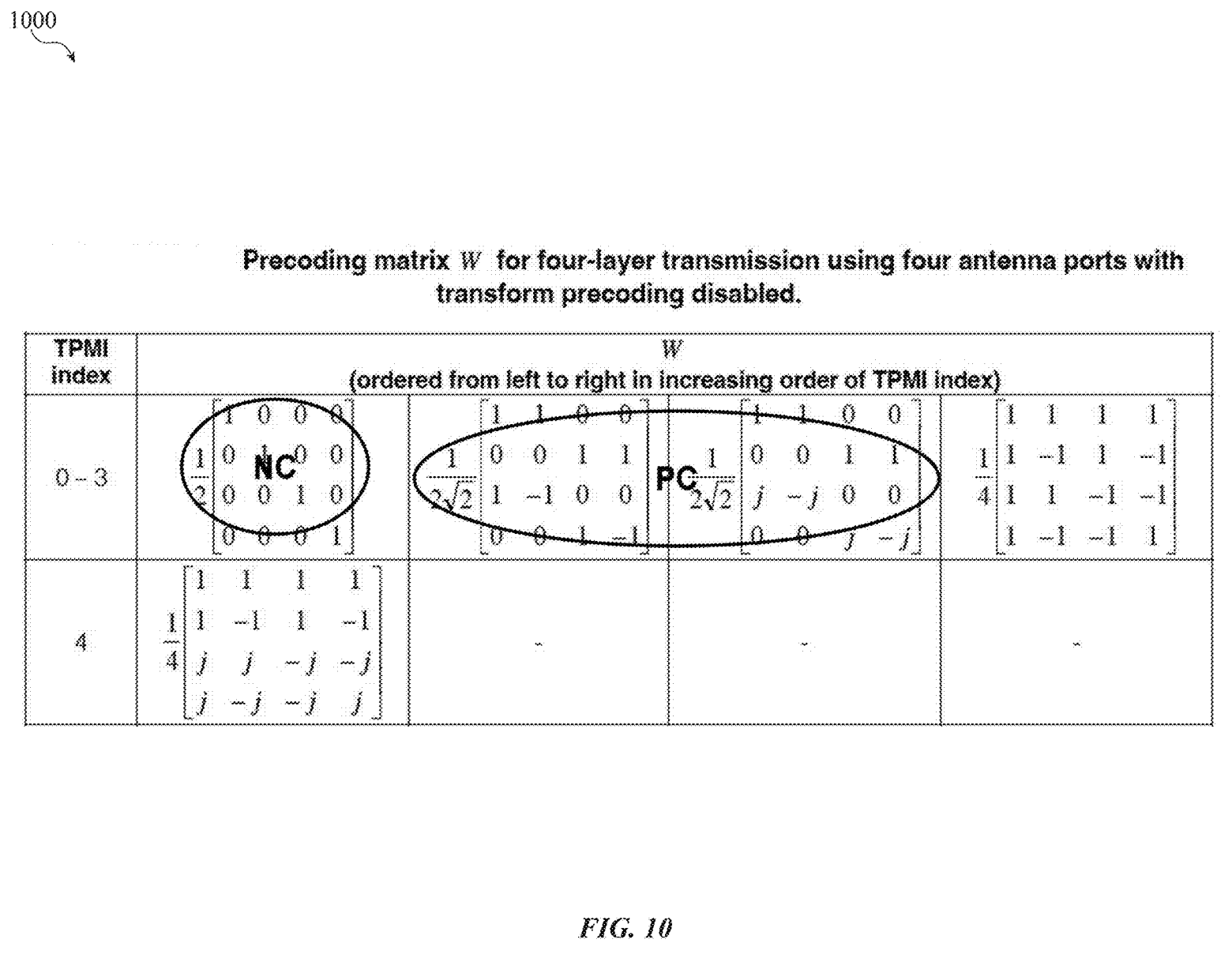

FIGS. 8 through 10 illustrate similar examples of precoders of a precoding matrix W using four antenna ports for two-layer transmission, three-layer transmission, and four-layer transmission, respectively. Each table 800, 900 and 1000 includes different precoders of tables corresponding to a different number of layers or ranks for a fully-coherent codebook for CP-OFDM, for example. Table 800 includes six different non-coherent precoders and eight different partially-coherent precoders in a nested structure with the remaining eight fully-coherent precoders. Table 900 includes one non-coherent precoder and two different partially-coherent precoders in a nested structure with the remaining four fully-coherent precoders. Table 1000 includes one non-coherent precoder and two different partially-coherent precoders in a nested structure with the remaining two fully-coherent precoders. The fully-coherent (FC) precoders always include or utilize all of the antenna ports using different phase rotations on the different antenna ports. Then for the partially-coherent (PC) precoders the coherency among different antenna pairs can be used. Additionally, for the non-coherent (NC) precoders, the UE can choose which antennas to use for as an antenna selection type of indication.

FIG. 11 illustrates a similar example of precoders of a precoding matrix using two antenna ports for a two-layer transmission, where RI=2 of a table 1100. Here, a non-coherent precoder only is nested with fully-coherent precoders of a precoding matrix.

For codebook-based 8 Tx transmission (e.g., physical uplink shared channel (PUSCH)), the UE 110 can down select from a fully coherent massive precoder structure according to various aspects or examples. In an aspect, a fully-coherent UE (e.g., 110, where Ng=1) can be configured with precoders considered for at least one or more Ng cases (where Ng=1, 2, 4, 8, alone or any combination). Ng equals to 1 means a fully-coherent configuration, where Ng is a number of antenna groups and within an antenna group the antennas are coherent, across the groups they are not coherent. If there is a single antenna group, this means that a codebook subset configuration of the UE is fully-coherent. Other antenna groups can also be configured. For example, when there are two antenna groups, a codebook subset configuration is partially-coherent with Ng=2; when there are four antenna groups, a codebook subset configuration is partially-coherent with Ng=4. Ng=8 means that the antennas or antenna ports are non-coherent across the antennas. In one example, for a fully-coherent UE, the Ng can indicate whether the UE should be configured with only fully-coherent precoders or the UE can be configured with fully-coherent precoders plus the partially coherent precoders with Ng=2. Thus, the UE or base station codebook being signaled can combine other Ng values together or only support certain values (e.g., Ng=1, 2, 4, 8, alone or any combination). Alternatively, or additionally, for a partially-coherent UE with Ng=2, fully-coherent precoders are not configured/indicated, and thus, Ng=1 may not be included in the codebook subset configuration. Here, a partially-coherent UE as Ng=2 can be configured with precoders for at least one or more Ng cases (where Ng=2, 4, 8, alone or any combination). Alternatively, or additionally, for a partially-coherent UE associated with or supporting Ng=4, the codebook subset configuration can be configured with precoders considered for at least one or more Ng values including Ng=4, 8, alone or in combination). A non-coherent UE (Ng=8) can only be configured with precoders considered for Ng=8.

In an aspect, the UE 110 can be configured with only one of the Ng values for codebook-based 8 Tx transmission. The UE 110 can down select from a fully coherent massive codebook structure according to various aspects. In this aspect, the UE can be configured with either FC precoders or PC precoders with Ng=4 or PC precoders with Ng=2 or NC precoders. Thus, multiple types of precoders are not necessarily combined together as in the above aspect and examples where UE supporting one Ng value can be configured with precoders of another Ng value in the codebook subset configuration. Here, in order for the UE 110 to switch between Ng values, a switch to another Ng value can be provided or received by an RRC configuration or signaling, or a medium access control control element (MAC-CE) to do the switching, but different values are configured at different times. For example, for a fully-coherent UE (Ng=1) the codebook subset configuration can be configured only with precoders considered for one of the Ng values or cases (e.g., Ng=1, 2, 4, 8). Alternatively, or additionally, a partially-coherent UE with Ng=2 can be configured only with precoders considered for one of Ng=2, 4, 8. Alternatively, or additionally, a partially-coherent UE with Ng=4 can be configured only with precoders considered for one of Ng=4, 8. Alternatively, or additionally, a non-coherent UE with Ng=8 can be configured only with precoders considered for Ng=8.

In an aspect, more restrictive options could be configured at the UE or base station for transmission where precoders corresponding to the same Ng of the UE only are configured. If a UE is a fully coherent UE (e.g., Ng=1), then only precoders for Ng=1 are utilized or considered for transmissions. Likewise, for a partially-coherent UE of Ng=2, only precoders for Ng=2 are considered or utilized. Alternatively, or additionally, for partially-coherent UE of Ng=4, only precoders for Ng=4 are considered or utilized. Alternatively, or additionally, for a non-coherent UE of Ng=8, only precoders for Ng=8 are considered or utilized.

The gNB 122 can signal to the UE 110 the number of precoders, the number of precoders will determine the overhead; also the complexity of the UE may be determined for the number of precoders that the UE and gNB needs to support at one time. As such, given these reasons there is some motivation to reduce the number of precoders to have signaled or configured at any one time.

FIG. 12 illustrates an example of table 1200 for partially coherent uplink precoders of Ng=2 (two antenna groups or groupings) for an 8Tx UE according to rank and layer splitting. In an aspect, fully-coherent uplink precoding by an 8Tx UE codebook can be based on an NR Release 15 single panel downlink (DL) Type I codebook with support for the following pairs of (N1, N2) values: (N1, N2)=(4, 1); (N1, N2)=(2, 2), as two types of value pairs or pairs of values that correspond to different antenna configurations.

For partially-coherent precoders for Ng=2 and Ng=4, especially with Ng=2, the codebook design can be based on the Release (Rel) 15 UL 4Tx codebook, where the UE is pre-configured or indicated, for example, for each antenna group which of the 4Tx UE precoders the UE uses for that particular antenna group as well as using fully-coherent precoders. In particular, for partially-coherent uplink precoding by an 8Tx UE codebook when Ng=2, the precoding or precoder configuration of the codebook can be based on the Rel-15 UL 4Tx codebook, where fully-coherent precoders can be utilized, and subject to UE determination on utilized partially-coherent precoders. When Ng=4 (four antenna groups) the precoding design or precoder configuration can be based on the Rel-15 UL 2Tx codebook, where fully-coherent precoders are being used.

For partially-coherent uplink precoding by an 8 Tx UE codebook where Ng=2 all the layers can be in one antenna group for rank=1. Thus, where the rank is 1, for a single MIMO layer, the (1, 0) or (0, 1) means the number of layers in first and second antenna groups. This combination means the UE (e.g., UE 110) can perform a layer 1 transmission in the first antenna group and nothing in the second antenna group. Alternatively, the UE 110 can transmit nothing in the first antenna group and do a layer 1 transmission in the second antenna group. Thus, the UE performs only a single-layer MIMO transmission in one antenna group at a time from among two antenna groups. Alternatively, or additionally, for Rank 2 and a two MIMO layer transmission, (2, 0), (0, 2) means a two-layer transmission in the first antenna group and a two-layer transmission in the second antenna group, respectively. The UE 110 can perform transmission based on associated precoders with two layers in a first antenna group or two layers in a second antenna group.

FIGS. 13-14 illustrate an example of tables 1300 and 1400, respectively, for partially-coherent uplink precoders of Ng=4 (utilizing four antenna groups) for an 8 Tx UE according to rank and layer splitting. With Ng=4, the four antenna groups, two antennas can be utilized in each group, in which the layer splitting combination becomes more complex. Here, four numbers are used to represent the number of layers in each antenna group.

For example, at FIG. 13, for Rank 1 (where rank indicates a number of MIMO layers), (1, 0, 0, 0), (0, 1, 0, 0), (0, 0, 1, 0), (0, 0, 0, 1) indicates four possible combinations here, using four different antenna groups, where each group is represented by number position in a parenthesis, the parenthesis containing four number position to represent the number of layers (Ng) in each antenna group. In another example, for Rank 2 precoding in an antenna group, the UE 110 could use up to two antenna groups, using one antenna group (as shown in the third row from the top), or two antenna groups (as shown in the third column to the right for layer splitting configuration(s) across four different antenna groups), for example.

At FIG. 14 partially coherent uplink precoding by an 8Tx UE codebook of Ng=4 (four antenna groupings) are illustrated for selection from among associated ranks. The entries associated with table 1400 can be supported for downselection among the rank and layer splitting cases as illustrated. For example, for Rank 3 the UE 110 can select from using two antenna groups or three antenna groups, wherein, as above, two antennas can be utilized in each group. The UE 110 can operate to split the number of layers differently among the four antenna groups to transmit for rank=3. When using two of the four antenna groups for transmission the following combinations can be used: (2, 1, 0, 0), (2, 0, 1, 0), (2, 0, 0, 1), (0, 2, 1, 0), (0, 2, 0, 1), (0, 0, 2, 1), (1, 2, 0, 0), (1, 0, 2, 0), (1, 0, 0, 2), (0, 1, 2, 1), (0, 1, 0, 2), (0, 0, 1, 2), for example. The representation (2, 1, 0, 0) denotes for example that two antennas are used in a first antenna group among four antenna groups and one antenna is used in a second antenna group from among the four antenna groups, giving a three MIMO layer transmission of rank=3 in a layer splitting configuration.

In an aspect, for Rank 4 the UE 110 can transmit by using three of four antenna groups when utilizing a layer splitting configuration as shown in the table 1500 (other possible number of groups for transmission among the four antenna groups such as two groups among the four antenna groups or four groups among the four antenna groups are illustrated in table 1300 of FIG. 13). For using three of the four antenna groups in transmission for Rank 4, the following combinations can be used: (2, 1, 1, 0), (0, 2, 1, 1), (1, 0, 2, 1), (1, 1, 0, 2), (1, 2, 1, 0), (1, 1, 2, 0), (0, 1, 2, 1), (0, 1, 1, 2), (1, 0, 1, 2), (2, 0, 1, 1), (2, 1, 0, 1), (1, 2, 0, 1), for example.

Codebook based transmission enables the UE to transmit the PUSCH using precoding weight that are selected form a codebook according to the standard by 3GPP. The base station 122 can provide instructions on the physical downlink control channel (PDCCH) (e.g., in downlink control information (DCI)) regarding the choice of weight that the UE then applies. Codebooks can be provided or presented as a list of matrices (e.g., precoder matrices) where each matrix defines a set of precoding weights; the dimensions of which depend upon a number of layers and a number of antenna ports, as discussed. For example, a codebook could be specified for two layer transmission using two antenna ports, and another codebook could be specified for two layer transmission using four antenna ports. Larger codebooks provide the benefit of increased flexibility in transmissions because there is a greater choice of precoding weights. However, they also create an increased signaling overhead because they require a longer bit string to signal the selected weights.

In a nested codebook structure, a total number of precoders can be quite large as well, which can lead to a large overhead for rank/precoder indication in the DCI and a high complexity for both the base station (e.g., gNB 122) and the UE (e.g., UE 110). Thus, various aspects herein contemplate operations and components to reduce a total number of precoders without significantly impacting performance. These aspects focus on a UE configured to support fully-coherent precoders or partially-coherent precoders. With fully-coherent precoder support, coherency among different antenna ports can be maintained. If coherence can be maintained within an antenna group, but non-coherent across antenna groups, then the precoder can be considered as partially-coherent. A partially-coherent configuration can be used to describe a set of antenna ports that include some coherent antenna ports and some non-coherent antenna ports. For example, within the context of codebook based transmission, a partially coherent codebook configuration can be applicable to a UE with antenna ports (e.g., four antenna ports) grouped into groups (e.g., pairs). The antenna ports within a particular grouping, or pair, are coherent, but one pair is not necessarily coherent with the other.

In an aspect, for a UE supporting fully-coherent precoders, a subset of one or more partially-coherent precoders, non-coherent precoders, or a combination of partially-coherent precoders and non-coherent precoders can be included that use a subset (one or more) of antenna ports compared to/with respect to the fully-coherent precoders. Here, it can be beneficial to accommodate cases when there is a significant power imbalance among the coherent antennas. For example, if four antennas or antenna ports are configured to be utilized and two of them are blocked by a hand or by some other object, then in this case it may be better not to use those antennas at all because the signals are too week from these two antennas, even though they are coherent. However, if the UE 110 were to use them, the signal strength may not be significant. Thus, it would be useful for efficiency to include the associated precoders from the set of partially-coherent precoders and/or non-coherent precoders that do not use those antenna ports. In this sense, the codebooks can allow for an indication not to use some of the antenna ports, which can be facilitated or configured according to the nested structure of a codebook or precoder matrix of a codebook. On the other hand, it may not provide much additional performance benefit to include the precoders from the set of partially-coherent precoders and/or non-coherent precoders that utilize all the antenna ports, because in this case, the UE 110 may just use one of the fully-coherent precoders, and not use the partially-coherent/non-coherent precoders.

Additionally, or alternatively, a lot of antenna architectures can be configured with a cross-polarized (cross-pol) antenna architecture, such as at antennas 204A and 202A, for example, where there can be coherency between the cross pol antennas 204A and 202A, which may have a same beamforming and orthogonal polarizations. These cross-pol antennas can effectively be considered as being at a same or proximate location so that each of them are either blocked or not blocked at the same time. This aspect can be further taken into consideration by the base station 122 or UE 110 to narrow down the precoders where a pair of antennas are either used or not at the same time.

The same discussion with respect to a UE supporting fully-coherent precoders can also apply to a UE support partially-coherent precoders. A UE supporting partially-coherent precoders can be configured to include a subset of one or more partially-coherent precoders, non-coherent precoders, or a combination of partially-coherent precoders and non-coherent precoders that use a subset of antenna ports in at least one of the antenna groups. The nested structure can include a subset of precoders that use a subset of the antenna ports in at least one of the antenna groups. Because within the antenna groups there is coherency among the antennas or antenna ports, and so here the UE or base station can check each antenna group instead of the whole, (e.g., the whole 8 Tx or 8 transmitter antenna ports). Likewise, to address the cases where significant power imbalance is observed at the receiver among the coherent antennas, it may be indicated or pre-configured to include precoders from the set of partially-coherent precoders and/or non-coherent precoders that do not use some of those antenna ports in the codebook or precoding matrix, as these may be blocked. Alternatively, or additionally, to address the cases where the cross-pol antennas could be included or not based on whether both are blocked or both non-blocked, it may be indicated or pre-configured to only include precoders from the set of partially-coherent precoders and/or non-coherent precoders that either use a pair of antennas or not use a pair of antennas at the same time, assuming the pair of antennas are considered to correspond to cross-pol antennas. This could also further reduce the total number of precoders being signaled or indicated.

Referring again to FIG. 8, the UE 110 can be configured to use a 4 Tx UE codebook for four antennas or four antenna ports where the UE is configured to support a fully-coherent codebook for data transmission. The UE's level of support or capability for transmission with a number of antenna ports can be provided to the base station 122, for example, via the UE capability information 102. The UE 110 can be configured for rank 2 transmission with associated precoders that include the six non-coherent precoders, the 8 partially-coherent precoders and the remaining 8 fully coherent precoders. In legacy configurations, the precoders for the UE 110 configured to support fully-coherent codebooks would include all fully-coherent precoders, partially-coherent precoders and non-coherent precoders in the precoding matrices to the UE 110. The rows of the precoder matrices can correspond with a number of antenna ports (e.g., four), while number of columns can correspond to the number of MIMO layers (e.g., two layers). The entries of a precoder matrix (e.g., the non-coherent (NC) precoders) can provide a simple switching function, in which one element within the matrix is "1" while the other element is "0". The base station can use these entries to switch uplink transmission between the antenna ports.

In an aspect, subset of less than all the partially-/non-coherent precoders can be indicated or pre-configured in the codebook subset configuration for situations where some of the antennas may be blocked to provide flexibility. In anticipation of situations where some antennas may be blocked, it could be advantageous to include at least some precoders that only use a subset of all the antennas or antenna ports.

However, if all 8 partially-coherent precoders use all four transmitting antenna ports for a UE with fully-coherent antennas, there may not be much advantage to using or configuring the partially-coherent precoders compared to using the fully-coherent precoders. Thus, including the partially-coherent precoders or the partially-coherent codebook may unnecessarily increase overhead signaling and complexity without providing a significant performance gain.

Additionally, or alternatively, in an aspect, non-coherent precoders could be used without partially-coherent precoders in the nested structure of a codebook subset configuration, or together with partially-coherent precoders, where only a subset of non-coherent precoders are included or indicated for use to further reduce the number of precoders in the codebook subset configuration, the codebook or a precoding matrix. For example, non-coherent precoders being used could be indicated by explicit signaling (or configured in the codebook subset configuration itself) to indicate inclusion of only non-coherent precoders with only two antenna ports being used. Only two antenna ports being used may occur when two antenna ports of the four are being blocked, for example. The codebook subset configuration could be pre-configured with such a limitation of the non-coherent precoders, or the UE could be directly indicated by one or more specific indications to not configure or use particular precoders. Alternatively, or additionally, a rule could be indicated such that certain non-coherent precoders being blocked according to a TPMI index or other condition (e.g., two or more non-coherent precoders not being used).

Additionally, or alternatively, to further reduce a number of non-coherent precoders from the nested structure of the codebook subset configuration, cross-pol antennas could be considered for reduction such that those pairs of antennas assumed as cross-pol antenna structures are either both being used, or otherwise considered as both being blocked and thus signaled or indicated to not be used. In an aspect, two non-coherent precoders could be signaled only with a TPMI index of 1 and 4 being used, for example, and any other non-coherent precoder could not be included in the codebook subset configuration or codebook signaling in DCI. Two non-coherent precoders therefore (with TPMI index of 1 and 4) can then be used since each of the other precoders corresponds to a pair of cross-pol antennas not being used.

In an aspect, the partially-coherent precoders can be removed from the codebook subset configuration or precoding matrix of the codebook for a fully-coherent UE or UE supporting fully-coherent precoders, for example. Additionally, only non-coherent precoders where only two antenna ports are used could be included in the codebook subset configuration. By further considering cross-pol antennas or pairs of antennas, further reduction of the number of precoders can be made. For example, antenna pairs that are both not blocked could be included in the codebook subset configuration and any other antenna pairs that are either both blocked or where only one is being blocked could not be included in the non-coherent precoders. As such, two non-coherent precoders would be included with TPMI=to 1 and 4, while other non-coherent precoders would not be included.

For example, in the indexing of table 800 of FIG. 8, it can be assumed that the first and the third antennas correspond to a pair of cross-pol antennas. Considering the first precoder circled with NC for non-coherent precoders) on the top row of index 0, represented as follows:

$$\begin{matrix} 1 & 0 \\ 0 & 1 \\ 0 & 0 \\ 0 & 0 \end{matrix}'$$

the first antenna would not be considered blocked, but the third could be considered as blocked in the first column. So this does not align with the assumption or rule (use both of a pair of antennas (as cross-pol antennas) or neither of them) because the assumption here is the first and the third antennas, if used in a precoder would be included together. Upon examination of the six non-coherent (NC) precoders, the non-coherent precoder with TPMI index of 1 (second one in first row of TPMI index 0-3) uses the first and third antennas and the one with TPMI index 4 uses the second and the fourth antennas or antenna ports as paired antennas or antenna ports. Alternatively, a different indexing of paired antennas or TPMI indexes could be utilized for selecting which non-coherent precoders to include in a codebook subset configuration.

In aspects, one option can be to include all the NC precoders. Another option can be to further narrow down to particular TPMI indexes (e.g., TPMI index 1 and 4, or other index/indices). Another option is to include a particular subset of the NC precoders in the codebook subset configuration to simply just reduce the total number of precoders, where exactly how to select can be somewhat arbitrary to just reduce the number of precoders being supported or signaled.

Referring briefly to FIG. 7, the codebook 700 or precoding matrix for a single layer and four antenna ports is configured when transform precoding is disabled. The codebook 700 has 28 entries, where each entry is a matrix with four rows to correspond with the four antenna ports and one column to correspond with the single layer configuration (with amplitude scaling factors not shown). The first four entries are applicable to a UE configured for transmission with non-coherent precoders (or a UE which has non-coherent antenna ports). These entries provide a simple switching function, where one element within the matrix is "1", while the other elements are "0". The base station 122 can use these entries to switch in uplink transmission between the four antenna ports.

The first twelve entries of the codebook 700 are also applicable to a UE configured for partial-coherent codebook (or a UE which has partially-coherent antenna ports). TPMI 4 to 7 have non-zero values for elements 1 and 3 (as active, not in-use, or not blocked for use), whereas TPMI 8 to 11 have non-zero values for elements 2 and 4 (as active, not in-use or not blocked for use). This design enables switching between the pairs of coherent antenna ports. Antenna ports 1 and 3 are assumed to be coherent (as pairs) and similarly antenna ports 2 and 4 are assumed to be coherent (as pairs). The first antenna port within the pair transmits the single layer directly, while the second antenna port within the pair transmits the single layer with a phase shift of 0, 90, 180 or 270 degrees. All 28 entries can be applicable to a UE which has coherent antenna ports. The final 16 entries allow the UE to transmit a single layer using all 4 antenna ports. The base station uses these entries to control the relative phase of the signals transmitted by each UE antenna port. The first antenna port transmits the single layer directly, while the second, third and fourth antenna ports transmit the single layer with various combinations of phase shift.

In an aspect, all of the partially-coherent/non-coherent precoders of the codebook 700 can be included in the codebook subset restriction signaled to the UE or configured by the UE 110 for use in data transmission along with the fully-coherent precoders. Alternatively, or additionally, all of the partially-coherent/non-coherent precoders can be included in the codebook subset restriction that use only a subset of the antenna ports, which as illustrated could include all of them because each uses less than all antenna ports. Alternatively, or additionally, a subset of the partially-coherent/non-coherent precoders only could be included with the fully-coherent precoders or in the nested structure of the codebook 700 in order to further reduce an amount of precoders from the total number, which could be based on indices or other condition.

Alternatively, or additionally, all of the partially-coherent precoders of the codebook 700 could be included in the codebook subset configuration (as the codebook 700), but not any non-coherent precoders; this reduction takes into account the pairs of antennas (as cross-pol antennas or coherent pairs) as being always blocked at the same time to configured a further reduction of precoders from the nested structure within the fully-coherent precoders, as all the non-coherent precoders are not aligned with this assumption, thus not included. Alternatively, or additionally, a subset of the partially-coherent precoders only (without non-coherent precoders) could be included within the nested precoder structure in order to further reduce an amount of precoders from the total number, which could be based on indices or other condition.

Referring briefly to FIGS. 9-10, the codebooks 900 and 1000 can be configured for a 4 Tx UE codebook for four antennas or four antenna ports, as well as three MIMO layers and four MIMO layers respectively. The UE 110 is configured to support a fully-coherent codebook or fully-coherent precoders for data transmission and include a nested structure of precoders with one or more of partially-coherent precoders or non-coherent precoders. Each codebook 900 and 1000 includes a single entry (the non-coherent precoder) for a UE not configured to support or have coherent antenna ports (as a non-coherent UE). These entries allow the UE 110 to transmit a single layer per antenna port. The fourth antenna port is unused when there are three layers. Each codebook includes two additional entries for a UE configured to support partially-coherent antenna ports (as a partially-coherent UE). In the case of three layers, the first and third antenna ports (which belong to a same coherent pair) transmit layer 1, while the second and fourth antenna ports transmit layers 2 and 3, respectively. In the case of four layers, layers 1 and 2 are transmitted using the first coherent pair, while layers 3 and 4 are transmitted using the second coherent pair. Both codebooks 900 and 100 include further additional entries for a fully-coherent UE, or a UE which has fully-coherent antenna ports as a part of the UE capability.

In an aspect, codebook 900 of FIG. 9 can be generated/processed to only have non-coherent precoders included in the nested precoder structure of the fully-coherent precoders. With rank 3 codebooks, as with codebook 900 enabling three-layer transmission, all the partially-coherent precoders are still using all four antenna ports. As such, the partially-coherent precoders could be removed from the codebook 900 or not considered in the processing of the codebook 900.

Alternatively, or additionally, the codebook 900 of FIG. 9 could be configured to not include any of the partially-coherent or non-coherent precoders within the codebook 900. This exclusion or reduction of the precoders in codebook 900 could be based on pairs of antennas or cross-pol antennas (antenna ports). By examining the precoder of TPMI index 0, three antenna ports would be used, and thus, not all may be active or not in use, in which cause the antenna ports may be considered blocked when examining pairs. If assume that cross-pol antennas or pairs of antennas would either be unblocked together or otherwise blocked together, then these antenna ports at TPMI index 0 would be considered blocked. The UE 110 could use four antenna ports instead, and thus, the fully-coherent precoders of codebook 900 could alone be sufficient.

Alternatively, or additionally, the codebook 1000 of FIG. 10 could be configured to not have any partially-coherent and non-coherent precoders. In particular, for Rank 4 codebooks like codebook 100 that uses four MIMO layer transmission with four antenna ports (antennas), the partially-coherent and non-coherent precoders are using all the antenna ports already. Including these may not provide much additional performance gain compared to using the fully-coherent precoders only.

Figure 15:
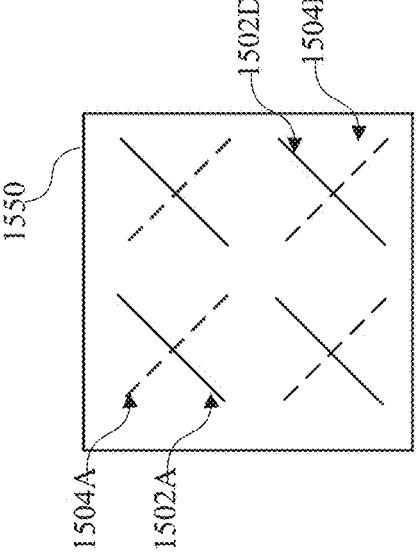

FIGS. 15 and 16 illustrate example antenna structures 1500 and 1600 for an 8Tx codebook configuration or subset configuration for a fully-coherent UE or a partially-coherent. The antenna structures 1550 and 1650, for example, are similar to the Rel-15 antenna structures considered for downlink Type 1 codebook. The antenna structure 1550 is a 2×2 cross-pol antennas including 1504A through 1504D of one polarization and 1502A through 1504D of another polarization, in which each 1504A is paired with 1502A, and so on with each through to the pair 1504D and 1502D.

The other antenna structure 1650 is 4×1 cross-pol antenna, which also supports cross-pol antennas or antennas paired that can be coherent together or unblocked together or otherwise considered blocked since they essentially are affected by a same or similar location as the other paired antenna. If there is blocking for one of the pairs (e.g., 1604A) typically both polarizations of the pairs (e.g., 1604A and 1602A) would be blocked at the same time. Each of these antenna structures 1550 or 1650 can have more than one antenna group. Depending on the channel quality indicators, for example, each antenna pair 1504A, 1502A through 1504D, 1602D, and 1604A, 1602A through 1604D, 1602D could be a group, respectively. In addition, more pairs of antennas could also be configured in similar structures, or different antenna groupings can be configured such that a subset (one or more) of all the antenna pairs or single antennas form one group of antennas, and the remainder form one or more other antenna groups as antenna subsets, for example.

FIGS. 17-19 illustrate example of codebooks 1700, 1800 and 1900, respectively, that are similar to the codebooks of FIGS. 12 through 15, for partially coherent uplink precoders of Ng=2 (two antenna groups or groupings) for an 8 Tx fully-coherent codebook. In an aspect, fully-coherent uplink precoding by an 8Tx UE codebook can be based on an NR Release 15 single panel downlink (DL) Type I codebook with support for the following pairs of (N1, N2) values. Thus, for example, (N1, N2)=(4, 1); (N1, N2)=(2, 2), as two types of value pairs or other pairs of values that correspond to different antenna configurations.

For partially-coherent precoders for Ng=2, the codebook designs can be based on the Release (Rel) 15 UL 4Tx codebook. The UE 110 can be configured for each antenna group which of the 4Tx codebook the UE uses, along with the fully-coherent precoders. In an aspect, the codebook 1700 can include partially-coherent precoders corresponding to each of the circled layer splitting combinations. The entry (1, 0) for Rank 1 designates that a first group uses fully-coherent uplink precoding from a 4 Tx codebook and there is no transmission from the antennas in the second group. Thus, when the rank is 1, for a single MIMO layer, the (1, 0) or (0, 1) indicates the transmission is done using first and second antenna groups, respectively. This indication means the UE (e.g., UE 110) can perform a layer 1 transmission in the first antenna group and nothing in the second antenna group. Alternatively, the UE 110 can transmit nothing in the first antenna group and do a layer 1 transmission in the second antenna group. Thus, the UE 110 performs only a single MIMO transmission in one antenna group at a time from among two antenna groups. Alternatively, or additionally, for the Rank 2 and a two MIMO layer transmission, the (2, 0), (0, 2) indicates a first antenna group (2, 0) and a second antenna group (0, 2). The UE 110 can perform transmission based on associated precoders with two layers in a first antenna group or two layers in a second antenna group. The same can be applied for the other circled antenna group entries (3, 0), (0, 3) for Rank 3, and (4, 0), (0, 4) for Rank 4, for example.

The circled splitting combinations and their associated precoders can be included in a subset of NG-2 partially coherent precoders as these correspond to cases where only a subset of the antenna ports are used. These include the following antenna group combinations: (1, 0), (0, 1); (2, 0), (0, 2); (3, 0), (0, 3); (4, 0), (0, 4). Such a subset of layer splitting combinations and corresponding precoders can be included in the codebook 1700, while not including the others not circled to reduce the number of partially coherent precoders in a fully-coherent codebook, or within the nested precoder structure of the fully-coherent codebook. In particular, the circled layer splitting combinations only use certain antenna ports, rather than all 8 antenna ports; they use up to four antenna ports out of the eight. In comparison, the circled combinations use only one antenna group at a time, where the other non-circled layer splitting combinations use more than one antenna group at time. The ones not circled can be removed from a subset of partially-coherent precoders, as the circled combinations can also be enabled with cross-pol antennas for either being blocked or not as a pair of antennas. Here, only a subset of the antenna ports are being used and the corresponding precoders can be included in the codebook 1700.

FIGS. 18-19 illustrate codebooks 1800 and 1900, respectively, for a UE supporting fully-coherent precoders (as a fully-coherent UE). In an aspect, a subset of partially-coherent precoders can be included in a codebook subset configuration with fully-coherent codebook corresponding to the circled layer splitting combinations, while non-circled combinations could be removed from the codebooks 1800 and 1900, respectively. The circled combinations correspond to configurations where a subset of the antenna ports are being used (or less than all antenna ports), rather than all of them.

The circled entries at codebooks 1800 and 1900 include the following for Rank 1: (1, 0, 0, 0), (0, 1, 0, 0), (0, 0, 1, 0), (0, 0, 0, 1); for Rank 2: (2, 0, 0, 0), (0, 2, 0, 0), (0, 0, 2, 0), (0, 0, 0, 2); for rank 2 using two of the four antenna groups for transmission: (1, 1, 0, 0), (1, 0, 1, 0), (1, 0, 0, 1), (0, 1, 1, 0), (0, 1, 0, 1), (0, 0, 1, 1); for Rank 3 when using two of the four antenna groups for transmission: (2, 1, 0, 0), (2, 0, 1, 0), (2, 0, 0, 1), (0, 2, 1, 0), (0, 2, 0, 1), (0, 0, 2, 1), (1, 2, 0, 0), (1, 0, 2, 0), (1, 0, 0, 2), (0, 1, 2, 1), (0, 1, 0, 2), (0, 0, 1, 2); for Rank 3 when using three of four antenna groups for transmission: (1, 1, 1, 0), (1, 1, 0, 1), (1, 0, 1, 1), (0, 1, 1, 1); for Rank 4 when using two of the four antenna groups for transmission: (2, 2, 0, 0), (2, 0, 2, 0), (2, 0, 0, 2), (0, 2, 2, 0), (0, 2, 0, 2), (0, 0, 2, 2); for Rank 4 when using three of the four antenna groups for transmission: (2, 1, 1, 0), (2, 2, 0, 1), (2, 0, 2, 1), (0, 2, 2, 1), (2, 1, 2, 0), (1, 2, 2, 0), (2, 1, 0, 2), (1, 2, 0, 2), (2, 0, 1, 2), (1, 0, 2, 2), (0, 2, 1, 2), (0, 1, 2, 2); and for Rank 6 when using three of the four antenna groups for transmission: (2, 2, 2, 0), (2, 2, 0, 2), (2, 0, 2, 2), (0, 2, 2, 2).

Additionally, or alternatively, the codebooks 1800 or 1900 can be further reduced by the base station or UE in the number of partially-coherent precoders of a subset of Ng=4 partially coherent precoders by down-selecting with another or additional subset according to indices or other condition, such as those from codebook 1900 of FIG. 19, for example.

Figure 20:
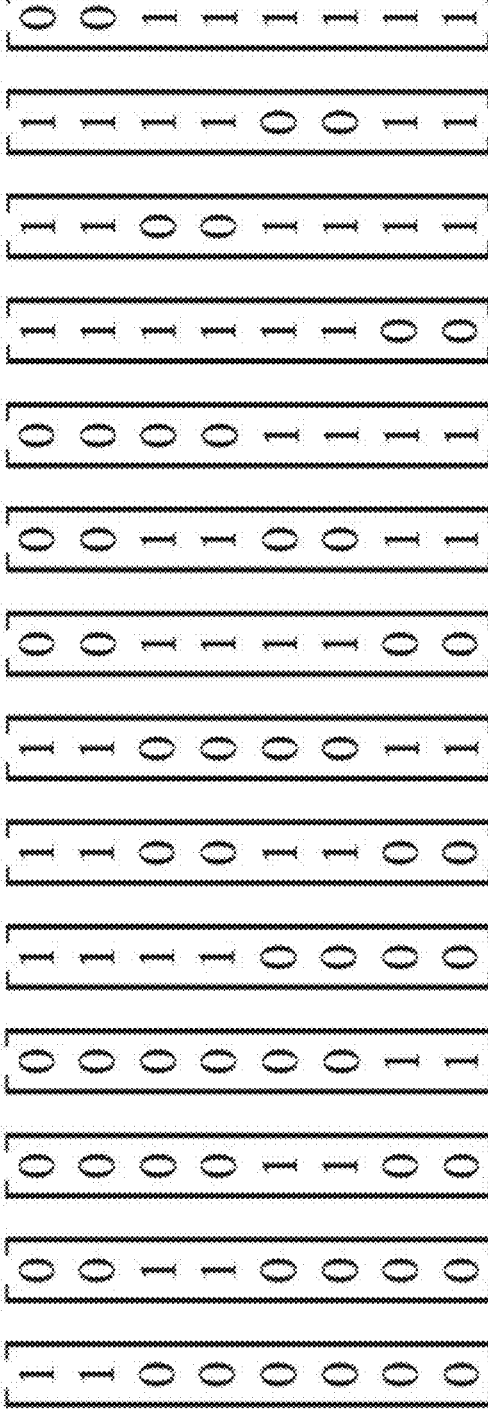
FIG. 20 illustrates an example of precoders in accordance with various aspects.

FIG. 20 illustrates an example of a subset of non-coherent precoders to be included in a fully-coherent codebook for a UE configured to support fully-coherent precoders as a fully-coherent UE. A fully-coherent codebook can be configured to only include a subset of non-coherent precoders in the nested precoder structure of fully-coherent precoders.

Alternatively, or additionally, all the non-coherent precoders where a subset of the antenna ports are used could be included in a codebook subset configuration of a fully-coherent codebook. This means non-coherent precoders are all included, except where all ones are indicated at each antenna port. However, if an exhaustive combination of precoders for 8 Tx codebooks is examined this may include up to 255 non-coherent precoders minus one (the precoder with all ones). This would leave 254 precoders remaining. Alternatively, or additionally, further reduction can be made on the number of precoders for a fully-coherent codebook by considering the pairs of antennas or cross-pol antennas being both blocked or not, where if one of the pair of cross-pol antennas is blocked both are considered as blocked, as discussed and intended throughout this disclosure. By reducing the number of precoders where cross-pol antenna structures are considered as both blocked or absent for transmission, then number of non-coherent precoders of a codebook subset configured for 8 Tx can be further reduced. This can bring the number of non-coherent precoders being included in codebook subset configuration of the fully-coherent codebook, or in the nested precoding structure of the fully-coherent codebook to only 14 non-coherent precoders 2000 instead of 254 or the exhaustive number of 255 non-coherent precoders.

The non-coherent precoders 2000 to be included in the codebook assume antenna ports 0/1, 2/3, 4/5, 6/7, represent pairs of cross-pol antennas. If the antenna ports are indexed differently or in a different numerology, the entries in the precoders could be arranged differently. For example, if antenna port zero and four correspond to a pair of cross-pol antennas then could have a one at the first top most slot of the first precoder on the left, and another one at the fifth index down, for example. Additionally, or alternatively, a different number of non-coherent precoders could be envisioned for being included or reduced from the exhaustive list of 255 non-coherent precoders, for example. As such, for any of the alternatives or aspects, an additional or alternative subset can be selected to reduce the number of non-coherent precoders in a fully-coherent codebook (with or without partially-coherent precoders), for example.

FIGS. 21-22 illustrate an example of codebooks 2100 and 2200 or portions of a codebook for a UE supporting partially-coherent precoders. In this example, the UE 110 can support the Ng=2 PC precoders. Additionally, or alternatively, a codebook subset configuration can be included with the subset being Ng=4 for partially-coherent precoders, while the codebook is configured for partially-coherent precoders of NG=2, for example. In this case, the circled entries for the layer splitting combinations can be included, those not circled can be reduced or removed from the codebook by the base station 122 or considered by the UE 110, for example. This is assuming that the first two antenna groups in Ng=4 correspond to one antenna group in Ng=2. For example, (1, 1, 0, 0) at Rank 2 would not be included because there the first two antenna groups correspond to one antenna group in the Ng=2 case (using two antenna groups) is actually already being covered by the Ng=2 precoders somewhat; this can be seen on the NG=2 partially-coherent codebook 1700 of FIG. 17 with (2, 0). As such, with (1, 1, 0, 0) the two layers are transmitted using the first four antenna ports, which is similar to the layer splitting of (2, 0) in the NG=2 codebook 1700. In both of these cases the first four antenna ports are used, so adding these additional precoders (1, 1, 0, 0), or both of them may not bring too much advantage. Similarly, other precoders could also be removed from the codebook 2100 and 2200 compared to the codebooks 1700 and 1800 such as (0, 0, 1, 1) of rank 2, and (2, 1, 0, 0), (0, 0, 2, 1), (1, 2, 0, 0), (0, 0, 1, 2) of rank 3, for example. As such, for any of the alternatives or aspects, an additional or alternative subset can be selected to reduce the number of non-coherent precoders in a partially-coherent codebook (with or without non-coherent precoders), for example, (e.g., by down-selecting with another or additional subset according to indices or other condition, such as those from codebooks disclosed herein).

FIG. 23 illustrates an example of non-coherent precoders for partially-coherent codebooks or codebook subset configurations to be included or excluded for a UE supporting partially-coherent precoders. In this example, the UE 110 can support the Ng=2 partially-coherent precoders, and the non-coherent precoders 2300 can be specifically excluded, while all other non-coherent precoders for an 8 Tx partially-coherent codebook. The non-coherent precoders 2300 represent cases where all the antenna ports within an Ng=2 or two-antenna groups are either used or not used (active or not active). For these cases represented by non-coherent precoders 2300, the Ng=2 partially-coherent precoders can be already sufficient, and thus, non-coherent precoders 2300 are excluded from the partially coherent codebook or codebook subset configuration thereof. These precoders 2300 are where all 8 antenna ports are used (first set of 8 antenna ports of the first precoder-left-most column). The middle precoder is when only the first four antenna ports are used and the second four are not used or inactive. The third on the right precoder is for the case where only the second four antenna ports are used. All these cases are somewhat covered by the Ng=2 PC codebook already and can be excluded from the codebook or codebook subset configuration for being somewhat redundant or repetitive.

Figure 24:
FIG. 24 illustrates an example of precoders in accordance with various aspects.

Alternatively, or additionally, FIG. 24 illustrates another example of non-coherent precoders 2400 for partially-coherent codebooks or codebook subset configurations thereof to be included or excluded for a UE supporting partially-coherent precoders for 8 transmit antenna ports or 8 Tx UE codebooks. Here, the precoders based on a pair/pairing of antennas as cross-pol antennas can be included where both are present or absent, assuming herein that either both are blocked or not blocked at the same time. This can further reduce the number of non-coherent precoders down from 255 minus the three precoders 2300 of FIG. 23, or 252 precoders to the twelve non-coherent precoders 2400. Similar to non-coherent precoders 2000 of FIG. 20 for a UE configured for a fully-coherent codebook, the non-coherent precoders 2400 for a UE configured for a partially-coherent codebook with cross-pol antenna ports have removed the fifth and tenth precoders from the left, which had 1, 1, 1, 1, 0, 0, 0, 0, and 0, 0, 0, 0, 1, 1, 1, 1, from top to bottom, in which in this aspect are both covered well by the Ng=2 partially-coherent precoders of the codebook already.

FIG. 25 illustrates an example of non-coherent precoders for partially-coherent codebooks or codebook subset configurations to be included or excluded for a UE supporting partially-coherent codebooks/precoders for 8 transmit antenna ports or 8 Tx UE codebooks. In this example, the UE can support the Ng=4 PC precoders. In an aspect, a subset of non-coherent precoders can be included where for at least one of the antenna groups, a subset of the antenna ports is being used.

For example, with the precoder 2502, for a first antenna group (out of four antenna groups for each precoder, Ng=4) only one antenna is used. Thus, precoder 2502 can be included in the partially-coherent codebook or a codebook subset configuration. For the other precoder 2504 on the right, all the antenna ports in the first and four antenna groups are used, while the remaining antenna groups are not used. This precoder 2504 may not be necessary and could be excluded from the partially-coherent codebook or a codebook subset configuration because the NG=4 precoders with layer splitting (2, 0, 0, 2) could be already sufficient, which can be seen at FIG. 21 for Rank 4 layer splitting across four antenna groups. Thus, the codebook can include non-coherent precoders where for at least one of the antenna groups a subset of the antenna groups are used, or less than all within the antenna group, for example.

This assumes that antenna ports 0/1, 2/3, 4/5, 6/7 belong to the four antenna groups, correspondingly. If antenna ports are indexed in a different way or numerology, the entries to the precoders could be arranged differently.

In another aspect, none of the non-coherent precoders could be included in the codebook for the UE supporting partially-coherent codebooks. Here, an assumption could be made that each antenna group is either blocked or not blocked at the same time, so both antenna ports should be either used or not used at the same time. These combinations could be covered by the layer splitting combinations of Ng=4 partially-coherent precoders sufficiently already.

Alternatively, or additionally, a different or another subset could be included to reduce a number of precoders for the non-coherent precoders based on one or more indices, or other condition.

In an aspect, for a UE supporting fully-coherent precoders or a codebook configured for a fully-coherent UE, the UE 110 can report one or more of the following UE capabilities in UE capability report 102, and can be configured with one of the following subject to UE capability: fully-coherent precoders only; fully-coherent precoders plus (+) a codebook subset configuration of Ng=2 and Ng=4 partially-coherent/non-coherent precoders that only use a subset of the antenna ports; fully-coherent precoders plus+a subset of Ng=2 and Ng=4 partially-coherent precoders that only use a subset of the antenna ports; fully-coherent precoders+a subset of Ng=2 partially-coherent/non-coherent precoders that only use a subset of the antenna ports; fully-coherent precoders+a subset of Ng=4 partially-coherent/non-coherent precoders that only use a subset of the antenna ports; fully-coherent precoders+a subset of Ng=2 partially-coherent precoders that only use a subset of the antenna ports; fully-coherent precoders+a subset of Ng=4 partially-coherent precoders that only use a subset of the antenna ports; or fully-coherent precoders+a subset of non-coherent precoders that only use a subset of the antenna ports.

In an aspect, for a UE supporting partially-coherent precoders or a codebook configured for a partially-coherent UE support Ng=2 precoders, the UE 110 can report one or more of the following UE capabilities in UE capability report 102, and can be configured with one of the following subject to UE capability: Ng=2 partially-coherent precoders only; Ng=2 partially-coherent precoders+a subset of Ng=4 partially-coherent/non-coherent precoders that only use a subset of the antenna ports in at least one of the antenna groups; Ng=2 partially-coherent precoders+a subset of Ng=4 partially-coherent precoders that only use a subset of the antenna ports in at least one of the antenna groups; or Ng=2 partially-coherent precoders+a subset of non-coherent precoders that only use a subset of the antenna ports in at least one of the antenna groups.

In an aspect, for a UE supporting partially-coherent precoders or a codebook configured for a partially-coherent UE support Ng=4 precoders, the UE 110 can report one or more of the following UE capabilities in UE capability report 102, and can be configured with one of the following subject to UE capability: Ng=4 partially-coherent precoders only; or Ng=4 partially-coherent precoders+a subset of non-coherent precoders that only use a subset of the antenna ports in at least one of the antenna groups.

Figure 26:
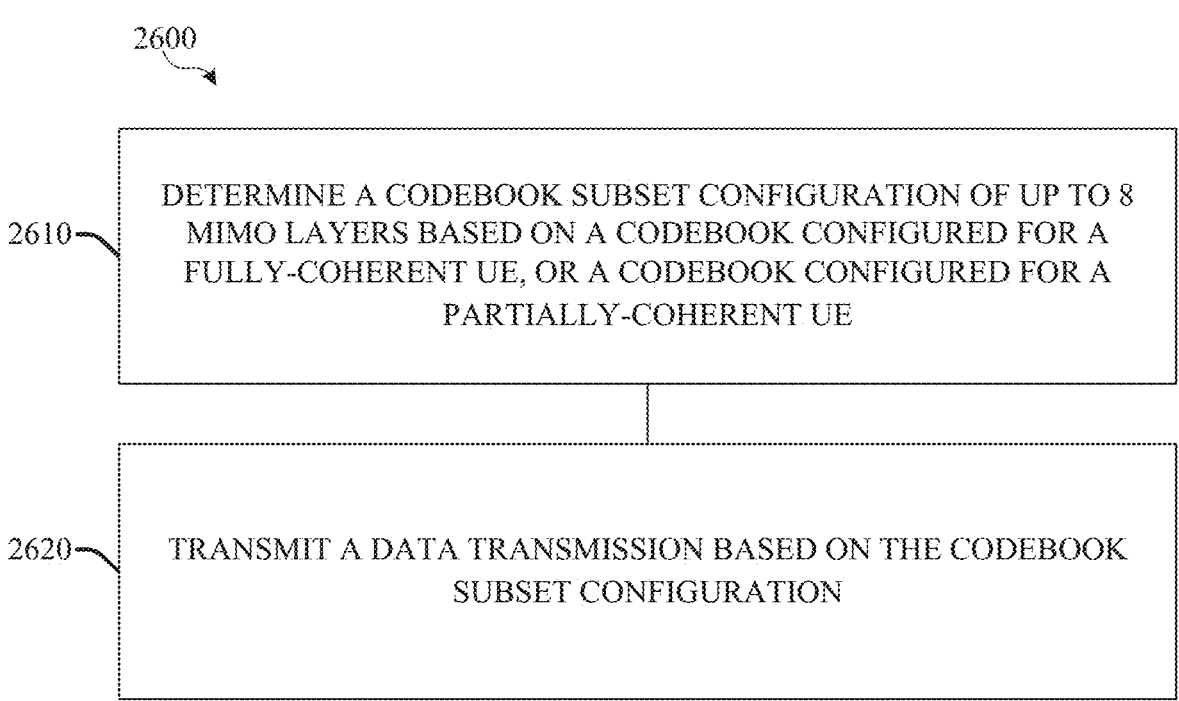
FIG. 26 illustrates an example process flow for a codebook subset configuration or design for an uplink data transmission in accordance with various aspects examples.

FIG. 26 illustrates an example process flow 2600 for a codebook subset configuration for an uplink data transmission by a UE. The process flow initiates at 2610 with determining a codebook subset configuration of up to 8 multiple-input multiple-output (MIMO) layers based on a codebook configured for a fully-coherent UE, or a codebook configured for a partially-coherent UE. The codebook comprises at least one of: a set of fully-coherent precoders, a set of partially-coherent precoders or a set of non-coherent precoders. The codebook subset configuration reduces a number of precoders from the set of partially-coherent precoders or the set of non-coherent precoders. At 2620, the UE can transmit a data transmission based on the codebook subset configuration.

In an aspect, the UE can receive a downlink control information (DCI) comprising one or more indications that indicate one or more precoders to use from the fully-coherent codebook or the partially-coherent codebook according to the codebook subset configuration. The UE can initially provide UE capability information comprising a support for a number of antenna groups of partially-coherent precoders or for fully-coherent precoders. The UE can then receive one or more indications that indicate precoders to use in the fully-coherent codebook, or the partially-coherent codebook, based on the codebook subset configuration and on the UE capability information.

The codebook can include the codebook subset configuration as a nested precoder structure of the codebook configured for the fully-coherent UE with fully-coherent precoders that further comprises one or more precoders of: partially-coherent precoders or non-coherent precoders, which use a subset of antenna ports among one or more antenna groups compared to the set of fully-coherent precoders.

Alternatively, or additionally, the codebook subset configuration can be configured for a partially-coherent UE that comprises a subset of one or more of: partially-coherent precoders or non-coherent precoders that use a subset of antenna ports within at least one antenna group.

Figure 27:
FIG. 27 illustrates an exemplary block diagram illustrating an example of user equipment(s) (UEs) communicatively coupled a network with network components as peer devices useable in connection with various embodiments (aspects) described herein.

FIG. 27 is an example network 2700 according to one or more implementations described herein. Example network 2700 can include UEs 110-1, 110-2, etc. (referred to collectively as "UEs 110" and individually as "UE 110"), a radio access network (RAN) 122, a core network (CN) 2730, application servers 2740, and external networks 2750.

UEs 110 can communicate and establish a connection with (be communicatively coupled to) RAN 122, which can involve one or more wireless channels 2714-1 and 2714-2, each of which can comprise a physical communications interface/layer. In some implementations, a UE can be configured with dual connectivity (DC) as a multi-radio access technology (multi-RAT) or multi-radio dual connectivity (MR-DC), where a multiple receive and transmit (Rx/Tx) capable UE can use resources provided by different network nodes or base stations 122 (e.g., 122-1 and 122-2) that can be connected via non-ideal backhaul (e.g., where one network node provides NR access and the other network node provides either E-UTRA for LTE or NR access for 5G). In such a scenario, one network node can operate as a master node (MN) and the other as the secondary node (SN). The MN and SN can be connected via a network interface, and at least the MN can be connected to the CN 2730. Additionally, at least one of the MN or the SN can be operated with shared spectrum channel access, and functions specified for UE 110 can be used for an integrated access and backhaul mobile termination (IAB-MT). Similar for UE 110, the IAB-MT can access the network using either one network node or using two different nodes with enhanced dual connectivity (EN-DC) architectures, new radio dual connectivity (NR-DC) architectures, or other direct connectivity such as an SL communication channel as an SL interface 112.

In some implementations, a base station (as described herein) can be an example of network node 122. As shown, UE 110 can additionally, or alternatively, connect to access point (AP) 2716 via connection interface 2718, which can include an air interface enabling UE 110 to communicatively couple with AP 2716. AP 2716 can comprise a wireless local area network (WLAN), WLAN node, WLAN termination point, etc. The connection 2718 can comprise a local wireless connection, such as a connection consistent with any IEEE 702.11 protocol, and AP 2716 can comprise a wireless fidelity (Wi-Fi®) router or other AP. AP 2716 could be also connected to another network (e.g., the Internet) without connecting to RAN 122 or CN 2730.

RAN 122 can also include one or more RAN nodes 122-1 and 122-2 (referred to collectively as RAN nodes 122, and individually as RAN node 122) that enable channels 2714-1 and 2714-2 to be established between UEs 110 and RAN 122. RAN nodes 122 can include network access points configured to provide radio baseband functions for data or voice connectivity between users and the network based on one or more of the communication technologies described herein (e.g., 2G, 3G, 4G, 5G, WiFi, etc.). As examples therefore, a RAN node can be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 122 can include a roadside unit (RSU), a transmission reception point (TRxP or TRP), and one or more other types of ground stations (e.g., terrestrial access points). In some scenarios, RAN node 122 can be a dedicated physical device, such as a macrocell base station, or a low power (LP) base station for providing femtocells, picocells or other like having smaller coverage areas, smaller user capacity, or higher bandwidth compared to macrocells. As described below, in some implementations, satellites 160 can operate as bases stations (e.g., RAN nodes 122) with respect to UEs 110. As such, references herein to a base station, RAN node 122, etc., can involve implementations where the base station, RAN node 122, etc., is a terrestrial network node and also to implementation where the base station, RAN node 122, etc., is a non-terrestrial network node.

Some or all of RAN nodes 122 can be implemented as one or more software entities running on server computers as part of a virtual network, which can be referred to as a centralized RAN (CRAN) or a virtual baseband unit pool (vBBUP). In these implementations, the CRAN or vBBUP can implement a RAN function split, such as a packet data convergence protocol (PDCP) split wherein radio resource control (RRC) and PDCP layers can be operated by the CRAN/vBBUP and other Layer 2 (L2) protocol entities can be operated by individual RAN nodes 122; a media access control (MAC)/physical (PHY) layer split wherein RRC, PDCP, radio link control (RLC), and MAC layers can be operated by the CRAN/vBBUP and the PHY layer can be operated by individual RAN nodes 122; or a "lower PHY"

split wherein RRC, PDCP, RLC, MAC layers and upper portions of the PHY layer can be operated by the CRAN/vBBUP and lower portions of the PHY layer can be operated by individual RAN nodes 122. This virtualized framework can allow freed-up processor cores of RAN nodes 122 to perform or execute other virtualized applications, for example.

In some implementations, an individual RAN node 122 can represent individual gNB-distributed units (DUs) connected to a gNB-control unit (CU) via individual F1 interfaces. In such implementations, the gNB-DUs can include one or more remote radio heads or radio frequency (RF) front end modules (RFEMs), and the gNB-CU can be operated by a server (not shown) located in RAN 122 or by a server pool (e.g., a group of servers configured to share resources) in a similar manner as the CRAN/vBBUP. Additionally, or alternatively, one or more of RAN nodes 122 can be next generation eNBs (i.e., gNBs) that can provide evolved universal terrestrial radio access (E-UTRA) user plane and control plane protocol terminations toward UEs 110, and that can be connected to a 5G core network (5GC) 2730 via a Next Generation (NG) interface 2724.

Any of the RAN nodes 122 can terminate an air interface protocol and can be the first point of contact for UEs 110. In some implementations, any of the RAN nodes 122 can fulfill various logical functions for the RAN 122 including, but not limited to, radio network controller (RNC) functions such as radio bearer management, uplink and downlink dynamic radio resource management and data packet scheduling, and mobility management. UEs 110 can be configured to communicate using orthogonal frequency-division multiplexing (OFDM) communication signals with each other or with any of the RAN nodes 122 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations cannot be limited in this regard. The OFDM signals can comprise a plurality of orthogonal subcarriers.

A physical downlink shared channel (PDSCH) can carry user data and higher layer signaling to UEs 110. The physical downlink control channel (PDCCH) can carry information about the transport format and resource allocations related to the PDSCH channel, among other things. The PDCCH can also inform UEs 110 about the transport format, resource allocation, and hybrid automatic repeat request (HARQ) information related to the uplink shared channel. Typically, downlink scheduling (e.g., assigning control and shared channel resource blocks to UE 110-2 within a cell) can be performed at any of the RAN nodes 122 based on channel quality information fed back from any of UEs 110. The downlink resource assignment information can be sent on the PDCCH used for (e.g., assigned to) each of UEs 110.

The PDCCH uses control channel elements (CCEs) to convey the control information, wherein a number of CCEs (e.g., 6 or other number) can consists of a resource element groups (REGs), where a REG is defined as a physical resource block (PRB) in an OFDM symbol. Before being mapped to resource elements, the PDCCH complex-valued symbols can first be organized into quadruplets, which can then be permuted using a sub-block interleaver for rate matching, for example. Each PDCCH can be transmitted using one or more of these CCEs, where each CCE can correspond to nine sets of four physical resource elements known as REGs. Four quadrature phase shift keying (QPSK) symbols can be mapped to each REG. The PDCCH can be transmitted using one or more CCEs, depending on the size of the DCI and the channel condition. There can be four or more different PDCCH formats with different numbers of CCEs (e.g., aggregation level, L=1, 2, 4, 8, or 16).

The RAN nodes 122 may be configured to communicate with one another via interface 2723. In implementations where the system is an LTE system, interface 2723 may be an X2 interface. In LTE networks, X2 and S1 interface are defined as the interfaces between RAN nodes and between RAN and Core Network. 5G may operate in two modes as non-standalone and standalone mode. For non-standalone operation the specification defines the extension for S1 and X2 interfaces as for standalone operation as X2/Xn for the interface between RAN nodes 122 and S1/NG for the interface 2724 between RAN 120 and CN 2730. The interface 2724 may be defined between two or more RAN nodes 122 (e.g., two or more eNBs/gNBs or a combination thereof) that connect to evolved packet core (EPC), the CN 2730, or between eNBs connecting to an EPC. In some implementations, the X2/Xn interface may include an X2/Xn user plane interface (X2-U/Xn-U) and an X2 control plane interface (X2-C/Xn-C). The X2-U/Xn-U may provide flow control mechanisms for user data packets transferred over the X2/Xn interface and may be used to communicate information about the delivery of user data between eNBs or gNBs. For example, the X2-U/Xn-U may provide specific sequence number information for user data transferred from a master eNB (MeNB) to a secondary eNB (SeNB); information about successful in sequence delivery of PDCP packet data units (PDUs) to a UE 110 from an SeNB for user data; information of PDCP PDUs that were not delivered to a UE 110; information about a current minimum desired buffer size at the SeNB for transmitting to the UE user data; and the like. The X2-C/Xn-C may provide intra-LTE access mobility functionality (e.g., including context transfers from source to target eNBs, user plane transport control, etc.), load management functionality, and inter-cell interference coordination functionality.

Alternatively, or additionally, RAN 122 can be also connected (e.g., communicatively coupled) to CN 2730 via a Next Generation (NG) interface as interface 2724. The NG interface 2724 can be split into two parts, a Next Generation (NG) user plane (NG-U) interface 2726, which carries traffic data between the RAN nodes 122 and a User Plane Function (UPF), and the S1 control plane (NG-C) interface 2728, which is a signaling interface between the RAN nodes 122 and Access and Mobility Management Functions (AMFs).

CN 2730 can comprise a plurality of network elements 2732, which are configured to offer various data and telecommunications services to customers/subscribers (e.g., users of UEs 110) who are connected to the CN 2730 via the RAN 122. In some implementations, CN 2730 can include an evolved packet core (EPC), a 5G CN, and/or one or more additional or alternative types of CNs. The components of the CN 2730 can be implemented in one physical node or separate physical nodes including components to read and execute instructions from a machine-readable or computer-readable medium (e.g., a non-transitory machine-readable storage medium).

As shown, CN 2730, application servers 2740, and external networks 2750 can be connected to one another via interfaces 2734, 2736, and 2738, which can include IP network interfaces. Application servers 2740 can include one or more server devices or network elements (e.g., virtual network functions (VNFs) offering applications that use IP bearer resources with CN 2730 (e.g., universal mobile telecommunications system packet services (UMTS PS) domain, LTE PS data services, etc.). Application servers 2740 can also, or alternatively, be configured to support one or more communication services (e.g., voice over IP (VOIP) sessions, push-to-talk (PTT) sessions, group communication sessions, social networking services, etc.) for UEs 110 via the CN 2730. Similarly, external networks 2750 can include one or more of a variety of networks, including the Internet, thereby providing the mobile communication network and UEs 110 of the network access to a variety of additional services, information, interconnectivity, and other network features.

In an aspect, the UE 110 can operate via the processing circuitry by determining a codebook subset configuration of up to 8 MIMO layers based on a codebook configured for a fully-coherent UE, or a codebook configured for a partially-coherent UE. The codebook can include at least one of: a set of fully-coherent precoders, a set of partially-coherent precoders or a set of non-coherent precoders, wherein the codebook subset configuration reduces a number of precoders from the set of partially-coherent precoders or the set of non-coherent precoders. The UE can then transmit a data transmission (e.g., an uplink data transmission via a physical channel such as a PUSCH) based on the codebook or codebook subset configuration.

One or more network components, devices or systems of network 2700 is configured to process, perform, generate, communicate or cause execution of any one or more combined aspects described herein or in association with any of the FIGS. 1 through 28 herein.

Figure 28:
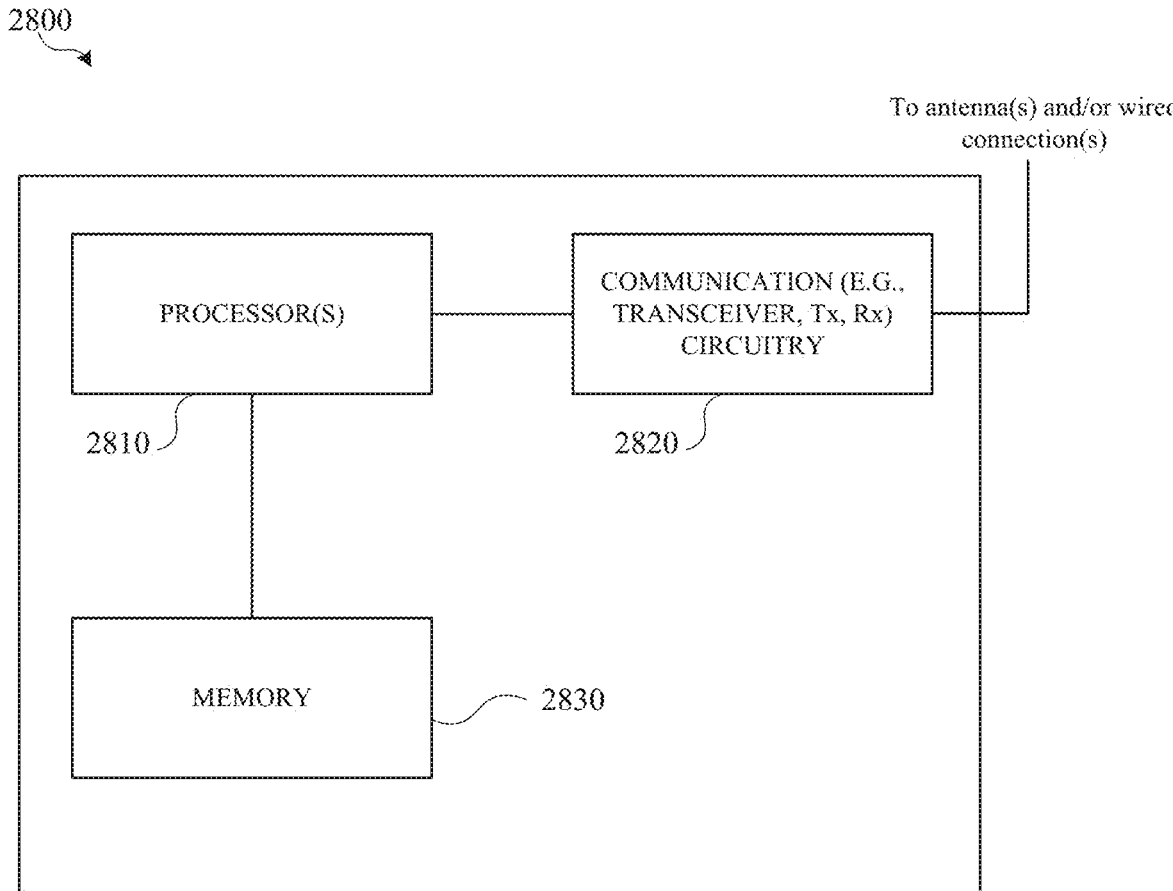
FIG. 28 illustrates an example simplified block diagram of a user equipment (UE) wireless communication device or other network device/component (e.g., eNB, gNB) in accordance with various aspects.

Referring to FIG. 28, illustrated is a block diagram of a UE device 110 (e.g., UE 110-1 or 110-2) or other network device/component (e.g., V-UE/P-UE, IoT, gNB, eNB, base station 122 or other participating network entity/component) 1100. The device 1100 includes one or more processors 2810 (e.g., one or more baseband processors) comprising processing circuitry and associated interface(s), transceiver circuitry 2820 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 2830 (which can comprise any of a variety of storage mediums and can store instructions and/or data associated with one or more of processor(s) 2810 or transceiver circuitry 2820).

Memory 2830 (as well as other memory components discussed herein, e.g., memory, data storage, or the like) can comprise one or more machine-readable medium/media including instructions that, when performed by a machine or component herein cause the machine or other device to perform acts of a method, an apparatus or system for communication using multiple communication technologies according to aspects, embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Any connection can be also termed a computer-readable medium.

Memory 2830 can include executable instructions, and be integrated in, or communicatively coupled to, processor or processing circuitry 2810. The executable instructions of the memory 2830 can cause processing circuitry 2810 to receive/process the instructions to receive/process/determine/generate a codebook subset configuration of up to 8 MIMO layers for 8 Tx UE codebook based on a codebook configured for a fully-coherent UE, or a codebook configured for a partially-coherent UE. The codebook can comprise at least one of: a set of fully-coherent precoders, a set of partially-coherent precoders or a set of non-coherent precoders, wherein the codebook subset configuration reduces a number of precoders from the set of partially-coherent precoders or the set of non-coherent precoders. The processing circuitry can then cause a data transmission to be transmitted based on the codebook subset configuration The device 2800 is configured to process, perform, generate, communicate or cause execution of any one or more combined aspects described herein or in association with any of the FIGS. 1 through 27.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment, aspect or example provided within this disclosure and can be applied to any of the systems/devices/components disclosed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure is described with reference to attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can be also a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus in a user equipment (UE), comprising: processing circuitry, comprising at least one memory, configured to execute instructions that cause the UE to: determine a codebook subset configuration of a plurality of multiple-input multiple-output (MIMO) layers based on a codebook configured for the UE, comprising at least one of: a set of fully-coherent precoders, a set of partially-coherent precoders or a set of non-coherent precoders, wherein the codebook subset configuration comprises a reduced number of precoders from the set of partially-coherent precoders or the set of non-coherent precoders; and transmit a data transmission based on the codebook subset configuration.

A second example can include the first example, wherein the codebook subset configuration is configured is based on the codebook configured for a fully-coherent UE or the codebook configured for a partially-coherent UE.

A third example can include the first or second example, wherein a nested precoder structure of the codebook configured for the fully-coherent UE comprises fully-coherent precoders and one or more precoders of: the set of partially-coherent precoders or the set of non-coherent precoders, that use a subset of antenna ports compared to the set of fully-coherent precoders.

A fourth example can include any one or more of the first through third examples, wherein a nested precoder structure of the codebook configured for the partially-coherent UE comprises a first set of partially-coherent precoders and one or more of: a second set of partially-coherent precoders or the set of non-coherent precoders that use a subset of antenna ports compared to the first set of partially-coherent precoders with a same rank, wherein the first set of partially-coherent precoders is associated with a different number of antenna groups than the second set of partially-coherent precoders.

A fifth example can include any one or more of the first through fourth examples, wherein the instructions, when executed by the processing circuitry, further configure the apparatus to: receive a downlink control information (DCI) comprising one or more indications that indicate one or more precoders to use from the set of fully-coherent precoders or the set of partially-coherent precoders according to the codebook subset configuration.

A sixth example can include any one or more of the first through fifth examples, wherein the instructions, when executed by the processing circuitry, further configure the apparatus to: reduce the number of precoders further based on whether a pair of antennas is both used or not used at a same time in the one or more precoders.

A seventh example can include any one or more of the first through sixth examples, wherein the instructions, when executed by the processing circuitry, further configure the apparatus to: configure the set of fully-coherent precoders only based on a UE capability; or configure the set of fully-coherent precoders and at least one of: a subset of the set of partially-coherent precoders or a subset of the set of non-coherent precoders that only use a subset of antenna ports.

An eighth example can include any one or more of the first through seventh examples, wherein the instructions, when executed by the processing circuitry, further configure the apparatus to: configure the codebook for a partially-coherent UE with at least one of: a subset of partially-coherent precoders or a subset of non-coherent precoders that use a subset of antenna ports within an at least one antenna group of the UE.

A ninth example can include any one or more of the first through eighth examples, wherein codebook subset configuration includes: all non-coherent precoders; a subset of the non-coherent precoders to further reduce the number of precoders; or a plurality of non-coherent precoders associated with predefined transmitter precoder matrix indicator (TPMI) indices.

A tenth example can include any one or more of the first through ninth examples, wherein the TPMI indices comprise a TPMI of index 1 and a TPMI of index 4.

An eleventh example can include any one or more of the first through tenth examples, wherein, in response to the codebook subset configuration comprising a rank indication equal to 3 MIMO layers or 4 MIMO layers, not including any of at least one of: the set of non-coherent precoders or the set of partially-coherent precoders.

An twelfth example can include any one or more of the first through tenth examples, wherein, in response to the codebook subset configuration comprising a rank indication equal to 1 MIMO layer include all of at least one of: the set of non-coherent precoders or the set of partially-coherent precoders, wherein including only all of the set of partially-coherent precoders includes an additional subset of partially-coherent precoders to reduce the number of precoders or elimination of any pair of antennas where at least one of an antenna pair is in use, or wherein, in response to the codebook subset configuration comprising a rank indication equal to 3 MIMO layers, including only the set of non-coherent precoders in the codebook subset configuration.

An thirteenth example can include any one or more of the first through tenth examples, wherein a subset of partially-coherent precoders are included in the codebook subset configuration where the subset of partially-coherent precoders correspond to precoders with combinations of layer splitting among antenna groups that use a subset of antenna ports.

A fourteenth example can be a method of a user equipment (UE) comprising: receiving, via processing circuitry, a codebook subset configuration of a plurality of multiple-input multiple-output (MIMO) layers based on a codebook configured for a UE, comprising at least one of: a set of fully-coherent precoders, a set of partially-coherent precoders or a set of non-coherent precoders, wherein the codebook subset configuration comprises a reduced number of precoders from the set of partially-coherent precoders or the set of non-coherent precoders; and transmitting a data transmission based on the codebook subset configuration.

A fifteenth example can include the fourteenth example, further comprising: including a subset of non-coherent precoders in the codebook configured for a fully-coherent UE or the codebook configured for a partially-coherent UE based on the codebook subset configuration that includes all non-coherent precoders except a precoder that indicates use of all eight antenna ports, or based on whether a pair of antennas is both used or not used at a same time in a precoder.

A sixteenth example can include any one or more of the fourteenth through the fifteenth examples, further comprising: including partially-coherent precoders in the codebook subset configuration that correspond to a second set of partially-coherent precoders that is different from the set of partially-coherent precoders for combinations of layer splitting among antenna groups to further reduce the number of precoders from the set of partially-coherent precoders.

A seventeenth example can include any one or more of the fourteenth through the sixteenth examples, wherein a number of antenna groups associated with the set of partially-coherent precoders of the codebook configured for a partially-coherent UE is two, and a number of antenna groups associated with the second set of partially-coherent precoders is four, and wherein any of the partially-coherent precoders that correspond to the second set of combinations of layer splitting that uses all antenna ports within one or both of the antenna groups of the set of partially-coherent precoders that is associated with two antenna groups is not to be included in the codebook configured for the partially-coherent UE.

An eighteenth example can include any one or more of the twelfth through the fifteenth examples, further comprising: including a subset of non-coherent precoders in the codebook configured for a partially-coherent UE, wherein the codebook subset configuration configures use of all non-coherent precoders except for ones using every antenna port within an antenna group; or including the subset of non-coherent precoders in the codebook configured for the partially-coherent UE based on whether pairs of antennas are both used or not used at a same time in a precoder.

A nineteenth example can include any one or more of the twelfth through eighteenth examples, further comprising: including a subset of non-coherent precoders in the codebook configured for a partially-coherent UE, wherein the codebook subset configuration configures use of all non-coherent precoders where for at least one of antenna groups a subset of antenna ports associated with that antenna group is to be used; or not including any non-coherent precoders in the codebook configured for the partially-coherent UE.

A twentieth example can include any one or more of the twelfth through nineteenth examples, further comprising: providing UE capability information comprising a support for a number of antenna groups of partially-coherent precoders or for fully-coherent precoders; and receiving precoders to use in the codebook configured for a fully-coherent UE, or the codebook configured for a partially-coherent UE, based on the codebook subset configuration and on the UE capability information.

A twenty-first example can be an apparatus in a base station, the apparatus comprising: processing circuitry, comprising at least one memory, configured to execute instructions that cause the base station to: generate a codebook subset configuration of a plurality of multiple-input multiple-output (MIMO) layers for codebook configured for a UE, wherein the codebook subset configuration reduces a number of precoders from a set of partially-coherent precoders or a set of non-coherent precoders from the codebook; and transmit a data transmission based on the codebook subset configuration.

A twenty-second example can include the twenty-first example, wherein the codebook subset configuration is generated with the set of fully-coherent precoders or the set of partially-coherent precoders based on a UE capability information, and wherein the plurality of MIMO layers comprises up to 8 MIMO layers.

A twenty-third example can include any one or more of the twenty-first through twenty-second examples, wherein the codebook subset configuration configures only fully-coherent precoders or the fully-coherent precoders with at least one of: a subset of partial-coherent precoders, or a subset of non-coherent precoders, that only use a subset of antenna ports, in response to receiving the UE capability information indicating support for the fully-coherent precoders.

A twenty-fourth example can include any one or more of the twenty-first through twenty-third examples, wherein the codebook subset configuration configures only partially-coherent precoders or the partially-coherent precoders with at least one of: a subset of partially-coherent precoders, or a subset of non-coherent precoders, that only use a subset of antenna ports in at least one antenna group of a number of antenna groups, in response to receiving the UE capability information indicating support for the partially-coherent precoders.

A twenty-fifth example can include any one or more of the twenty-first through twenty-fourth examples, wherein the number of antenna groups in the codebook configured for a partially-coherent UE comprises two antenna groups, or four antenna groups, of partially-coherent precoders, wherein, in response to the number of antenna groups in the codebook configured for a partially-coherent UE comprising two, the subset of partially-coherent precoders or the subset of non-coherent precoders comprises a total number of antenna groups comprising four antenna groups.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A baseband processor for a user equipment (UE), the baseband processor comprising:

one or more processors configured to, when executing instructions stored in a memory, perform operations comprising:

receiving, in radio resource control (RRC) signaling or a medium access control (MAC) control element (CE), an indication of a number of antenna groups, wherein each antenna group of the number of antenna groups comprises a set of coherent antennas, and wherein the sets of coherent antennas across antenna groups are non-coherent with one another;

determining a codebook subset configuration of a plurality of multiple-input multiple-output (MIMO) layers based on a codebook configured for the UE and the indicated number of antenna groups, wherein the codebook comprises at least one of: a set of fully-coherent precoders, a set of partially-coherent precoders, or a set of non-coherent precoders; and providing data to a radio frequency (RF) interface for transmission based on the codebook subset configuration.

2. The baseband processor of claim 1, wherein the codebook is configured for a fully-coherent UE, or wherein the codebook is configured for a partially-coherent UE.

3. The baseband processor of claim 2, wherein a nested precoder structure of the codebook configured for the fully-coherent UE comprises fully-coherent precoders and one or more precoders of: the set of partially-coherent precoders or the set of non-coherent precoders, that use a subset of antenna ports compared to the set of fully-coherent precoders.

4. The baseband processor of claim 2, wherein a nested precoder structure of the codebook configured for the partially-coherent UE comprises a first set of partially-coherent precoders and one or more of: a second set of partially-coherent precoders or the set of non-coherent precoders that use a subset of antenna ports compared to the first set of partially-coherent precoders with a same rank, wherein the first set of partially-coherent precoders is associated with a different number of antenna groups than the second set of partially-coherent precoders.

5. The baseband processor of claim 1, wherein the operations further comprise:

receiving a downlink control information (DCI) indicating one or more precoders to use from the set of fully-coherent precoders or the set of partially-coherent precoders according to the codebook subset configuration.

6. The baseband processor of claim 5, wherein the operations further comprise:

reducing a number of precoders in the codebook subset configuration relative to the codebook configured for the UE based on whether a pair of cross-polarized antennas is both used or not used at a same time in each precoder of the codebook configured for the UE.

7. The baseband processor of claim 1, wherein the operations further comprise:

configuring the set of fully-coherent precoders only based on a UE capability; or configuring the set of fully-coherent precoders and at least one of: a subset of the set of partially-coherent precoders or a subset of the set of non-coherent precoders that only use a subset of antenna ports.

8. The baseband processor of claim 1, wherein the operations further comprise:

configuring the codebook for a partially-coherent UE with at least one of: a subset of partially-coherent precoders or a subset of non-coherent precoders that use a subset of antenna ports within at least one antenna group of the UE.

9. The baseband processor of claim 1, wherein the codebook subset configuration includes:

an entirety of the set of non-coherent precoders;

a subset of the set of non-coherent precoders to further reduce the number of precoders; or a plurality of non-coherent precoders associated with predefined transmitter precoder matrix indicator (TPMI) indices.

10. The baseband processor of claim 1, wherein the number of antenna groups comprises an Ng value, and wherein the RRC signaling or the MAC CE includes an indication to switch to the Ng value from a previous Ng value.

11. A baseband processor for a base station, the baseband processor configured to, when executing instructions stored in a memory, perform operations comprising:

providing, for transmission via radio frequency (RF) circuitry, an indication of a number of antenna groups for a user equipment (UE), wherein the indication is included in radio resource control (RRC) signaling or a medium access control (MAC) control element (CE), wherein each antenna group of the number of antenna groups comprises a set of coherent antennas, and wherein the sets of coherent antennas across antenna groups are non-coherent with one another;

generating a codebook subset configuration of a plurality of multiple-input multiple-output (MIMO) layers for a codebook configured for the UE based on the indicated number of antenna groups for the UE; and communicating, via the RF circuitry, with the UE based on the codebook subset configuration.

12. The baseband processor of claim 11, wherein the codebook subset configuration is generated with the set of fully-coherent precoders or the set of partially-coherent precoders based on a UE capability information, and wherein the plurality of MIMO layers comprises up to 8 MIMO layers.

13. The baseband processor of claim 11, wherein the codebook subset configuration configures fully-coherent precoders with at least one of: a subset of partial-coherent precoders, or a subset of non-coherent precoders, that use a subset of antenna ports relative to the fully-coherent precoders, in response to receiving UE capability information indicating support for the fully-coherent precoders.

14. The baseband processor of claim 11, wherein the codebook subset configuration configures only partially-coherent precoders or the partially-coherent precoders with at least one of: a subset of partially-coherent precoders, or a subset of non-coherent precoders, that only use a subset of antenna ports in at least one antenna group of a number of antenna groups, in response to receiving UE capability information indicating support for the partially-coherent precoders.

15. The baseband processor of claim 10, wherein different Ng values are configured at different times.

16. A method of a user equipment (UE) comprising:

determining a codebook subset configuration of a plurality of multiple-input multiple-output (MIMO) layers based on whether a pair of cross-polarized antennas are both used or not used at a same time in each precoder of a codebook configured for the UE, wherein the codebook comprises at least one of: a set of fully-coherent precoders, a set of partially-coherent precoders, or a set of non-coherent precoders, and wherein the codebook subset configuration comprises a reduced number of precoders from the set of partially-coherent precoders or the set of non-coherent precoders; and transmitting data based on the codebook subset configuration.

17. The method of claim 16, further comprising:

including a subset of non-coherent precoders in the codebook configured for a partially-coherent UE, wherein the codebook subset configuration configures use of all non-coherent precoders except for ones using every antenna port within an antenna group.

18. The method of claim 16, further comprising:

including a subset of non-coherent precoders in the codebook configured for a partially-coherent UE, wherein the codebook subset configuration configures use of all non-coherent precoders that use a subset of antenna ports.

19. The method of claim 16, further comprising:

providing UE capability information indicating a support for a number of antenna groups of partially-coherent precoders or fully-coherent precoders; and receiving an indication of precoders to use in the codebook configured for the UE based on the codebook subset configuration and on the UE capability information, wherein the UE comprises a fully-coherent UE or a partially-coherent UE.

20. The method of claim 16, wherein the codebook subset configuration includes one or more partially-coherent precoders and one or more fully-coherent precoders, and wherein each of the one or more partially-coherent precoders uses a reduced number of antenna ports relative to each of the one or more fully-coherent precoders.

\* \* \* \* \*